(12) United States Patent
Kimba

(10) Patent No.: US 10,816,323 B2
(45) Date of Patent: Oct. 27, 2020

(54) FILM-THICKNESS MEASURING APPARATUS, POLISHING APPARATUS, AND POLISHING METHOD

(71) Applicant: EBARA CORPORATION, Tokyo (JP)

(72) Inventor: Toshifumi Kimba, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 90 days.

(21) Appl. No.: 16/031,727

(22) Filed: Jul. 10, 2018

(65) Prior Publication Data

US 2019/0017808 A1   Jan. 17, 2019

(30) Foreign Application Priority Data

Jul. 14, 2017 (JP) ................................ 2017-138270

(51) Int. Cl.
  *G01B 11/06* (2006.01)
  *B24B 37/013* (2012.01)

(52) U.S. Cl.
  CPC ........ *G01B 11/0625* (2013.01); *B24B 37/013* (2013.01); *G01B 2210/56* (2013.01)

(58) Field of Classification Search
  CPC ............ G01B 11/0625; G01B 2210/56; G01B 11/0616–0683; B24B 37/013; B24B 37/005
  See application file for complete search history.

(56) References Cited

U.S. PATENT DOCUMENTS

| 2003/0086097 | A1* | 5/2003 | Finarov | G01B 11/0625 356/630 |
| 2012/0133925 | A1* | 5/2012 | Nakasho | G01J 1/0462 356/218 |
| 2014/0146317 | A1* | 5/2014 | Arimoto | G01J 3/0297 356/402 |
| 2014/0323016 | A1* | 10/2014 | Kimba | B24B 37/013 451/5 |

FOREIGN PATENT DOCUMENTS

| JP | 2009-302577 A | 12/2009 |
| JP | 2017-005014 A | 1/2017 |

* cited by examiner

*Primary Examiner* — Hina F Ayub
*Assistant Examiner* — Amanda Merlino
(74) *Attorney, Agent, or Firm* — BakerHostetler

(57) ABSTRACT

A film-thickness measuring apparatus includes: a light source; an illuminating fiber coupled to the light source and having a distal end disposed at a predetermined position in a wafer supporting structure; a spectrometer configured to decompose reflected light from a wafer in accordance with wavelength and measure an intensity of the reflected light at each of wavelengths; a first light-receiving fiber having a distal end disposed at the predetermined position; a second light-receiving fiber having a distal end which is disposed at the predetermined position and is adjacent to the distal end of the first light-receiving fiber; a processor configured to determine a film thickness of the wafer based on a spectral waveform indicating a relationship between the intensity of the reflected light and the wavelength; and an optical-path (Continued)

selecting mechanism configured to optically connect and disconnect the second light-receiving fiber and the spectrometer.

8 Claims, 18 Drawing Sheets

DISTAL END OF ILLUMINATING FIBER

DISTAL END OF FIRST LIGHT-RECEIVING FIBER

DISTAL END OF SECOND LIGHT-RECEIVING FIBER

DISTAL END OF ILLUMINATING FIBER

DISTAL END OF FIRST LIGHT-RECEIVING FIBER

DISTAL END OF SECOND LIGHT-RECEIVING FIBER

DISTAL END OF ILLUMINATING FIBER

DISTAL END OF FIRST LIGHT-RECEIVING FIBER

DISTAL END OF SECOND LIGHT-RECEIVING FIBER

DISTAL END OF ILLUMINATING FIBER

DISTAL END OF FIRST LIGHT-RECEIVING FIBER

DISTAL END OF SECOND LIGHT-RECEIVING FIBER

DISTAL END OF ILLUMINATING FIBER

DISTAL END OF LIGHT-RECEIVING FIBER

FILM-THICKNESS MEASURING APPARATUS, POLISHING APPARATUS, AND POLISHING METHOD

CROSS REFERENCE TO RELATED APPLICATION

This document claims priority to Japanese Patent Application Number 2017-138270 filed Jul. 14, 2017, the entire contents of which are hereby incorporated by reference.

BACKGROUND

Semiconductor devices are manufactured through several processes including a process of polishing a dielectric film, e.g., $SiO_2$, and a process of polishing a metal film, e.g., copper or tungsten. Manufacturing processes of backside illumination CMOS sensor and through-silicon via (TSV) include a process of polishing a silicon layer (or silicon wafer), in addition to the polishing processes of the dielectric film and the metal film. Polishing of the wafer is terminated when a thickness of a film (e.g., the dielectric film, the metal film, or the silicon layer), constituting a wafer surface, has reached a predetermined target value.

Polishing of a wafer is performed using a polishing apparatus. In order to measure a film thickness of a non-metal film such as a dielectric film or a silicon layer, the polishing apparatus generally includes an optical film-thickness measuring apparatus. This optical film-thickness measuring apparatus is configured to direct light, emitted from a light source, onto a surface of the wafer and analyze a spectrum of reflected light from the wafer to detect the film thickness of the wafer.

Depending on a type of devices formed on the surface of the wafer, it may be desirable to measure the film thickness over a wide region of the wafer surface, or may be desirable to measure the film thickness in a narrow region of the wafer surface. For example, when the film thickness in a particular region, such as a memory cell, is to be monitored, it is desirable to set a narrow film-thickness measuring region for removing unwanted film-thickness information. On the other hand, when the film thickness over the entirety of the wafer surface is to be monitored, it is desirable to set a wide film-thickness measuring region for reducing a variation in the film thickness between regions.

SUMMARY OF THE INVENTION

According to an embodiment, there is provided a film-thickness measuring apparatus which can change a size of a film-thickness measuring region. According to embodiment, there are provided a polishing apparatus and a polishing method for polishing a wafer, while changing a size of a film-thickness measuring region.

Embodiments, which will be described below, relate to a film-thickness measuring apparatus for measuring a thickness of a film formed on a surface of a wafer, and more particularly to a film-thickness measuring apparatus for detecting a film thickness of a wafer by analyzing optical information contained in reflected light from the wafer. The below-described embodiments also relate to a polishing apparatus and polishing method for polishing a wafer, while measuring the film thickness with such a film-thickness measuring apparatus.

In an embodiment, there is provided a film-thickness measuring apparatus comprising: a light source; an illuminating fiber coupled to the light source and having a distal end disposed at a predetermined position in a wafer supporting structure, the illuminating fiber not projecting from a surface of the wafer supporting structure; a spectrometer configured to decompose reflected light from a wafer in accordance with wavelength and measure an intensity of the reflected light at each of wavelengths; a first light-receiving fiber having a distal end disposed at the predetermined position, the first light-receiving fiber being coupled to the spectrometer; a second light-receiving fiber having a distal end which is disposed at the predetermined position and is adjacent to the distal end of the first light-receiving fiber; a processor configured to determine a film thickness of the wafer based on a spectral waveform indicating a relationship between the intensity of the reflected light and the wavelength; and an optical-path selecting mechanism configured to optically connect and disconnect the second light-receiving fiber and the spectrometer.

In an embodiment, the distal end of the second light-receiving fiber comprises a plurality of distal ends which are arranged around the distal end of the first light-receiving fiber.

In an embodiment, the distal end of the first light-receiving fiber comprises a plurality of distal ends which are arranged around the distal end of the second light-receiving fiber.

In an embodiment, the optical-path selecting mechanism comprises an optical-path switching device configured to selectively connect the second light-receiving fiber to either the spectrometer or the light source.

In an embodiment, the optical-path switching device includes: a first connection fiber coupled to the light source; a second connection fiber coupled to the spectrometer; and an optical switch configured to couple the second light-receiving fiber to either the first connection fiber or the second connection fiber.

In an embodiment, the optical-path selecting mechanism comprises a shutter mechanism disposed between the second light-receiving fiber and the spectrometer.

In an embodiment, there is provided a polishing apparatus, comprising: a wafer supporting structure; a polishing head configured to press a wafer against a polishing pad on the wafer supporting structure; and a film-thickness measuring apparatus including a light source, an illuminating fiber coupled to the light source and having a distal end disposed at a predetermined position in the wafer supporting structure, the illuminating fiber not projecting from a surface of the wafer supporting structure, a spectrometer configured to decompose reflected light from the wafer in accordance with wavelength and measure an intensity of the reflected light at each of wavelengths, a first light-receiving fiber having a distal end disposed at the predetermined position, the first light-receiving fiber being coupled to the spectrometer, a second light-receiving fiber having a distal end which is disposed at the predetermined position and is adjacent to the distal end of the first light-receiving fiber, a processor configured to determine a film thickness of the wafer based on a spectral waveform indicating a relationship between the intensity of the reflected light and the wavelength, and an optical-path selecting mechanism configured to optically connect and disconnect the second light-receiving fiber and the spectrometer.

In an embodiment, there is provided a polishing method comprising: pressing a wafer against a polishing pad by a polishing head to polish the wafer, while measuring a film thickness of the wafer by a film-thickness measuring apparatus, the film-thickness measuring apparatus including (i) a light source, (ii) an illuminating fiber coupled to the light source and having a distal end disposed at a predetermined position in a wafer supporting structure, the illuminating fiber not projecting from a surface of the wafer supporting structure, (iii) a spectrometer configured to decompose reflected light from a wafer in accordance with wavelength and measure an intensity of the reflected light at each of wavelengths, (iv) a first light-receiving fiber having a distal end disposed at the predetermined position, the first light-receiving fiber being coupled to the spectrometer, (v) a second light-receiving fiber having a distal end which is disposed at the predetermined position and is adjacent to the distal end of the first light-receiving fiber, (vi) a processor configured to determine a film thickness of the wafer based on a spectral waveform indicating a relationship between the intensity of the reflected light and the wavelength, and (vii) an optical-path selecting mechanism configured to optically connect and disconnect the second light-receiving fiber and the spectrometer; and operating the optical-path selecting mechanism by the processor to optically connect or disconnect the second light-receiving fiber and the spectrometer during polishing of the wafer.

In an embodiment, there is provided a film-thickness measuring apparatus comprising: a light source; an illuminating fiber coupled to the light source and having a distal end disposed at a predetermined position in a wafer supporting structure, the illuminating fiber not projecting from a surface of the wafer supporting structure; a spectrometer configured to decompose reflected light from a wafer in accordance with wavelength and measure an intensity of the reflected light at each of wavelengths; a light-receiving fiber having a distal end disposed at the predetermined position; a processor configured to determine a film thickness of the wafer based on a spectral waveform indicating a relationship between the intensity of the reflected light and the wavelength; and an optical system disposed between the light-receiving fiber and the spectrometer, the optical system including a field stop whose degree of opening is variable.

In an embodiment, there is provided a polishing method comprising: adjusting a degree of opening of a field stop of an optical system based on a type of structure formed on a surface of a wafer; polishing the wafer; directing light, emitted by a light source, to a surface of the wafer during polishing of the wafer, while transmitting reflected light from the wafer through the optical system to a spectrometer; producing a spectral waveform indicating a relationship between intensity of the reflected light and wavelength; and determining a film thickness of the wafer based on the spectral waveform.

In an embodiment, the polishing method further comprises changing the degree of opening of the field stop during polishing of the wafer.

The size of the film-thickness measuring region depends on the size of the light-receiving region that receives the reflected light from the wafer. The above-described embodiments make it possible to select an appropriate size of the light-receiving region, i.e., the film-thickness measuring region, based on a type of structure, such as a device or a film formed on the surface of the wafer. As a result, the film-thickness measuring apparatus can measure an accurate film thickness.

DESCRIPTION OF THE EMBODIMENTS

Figure 1:
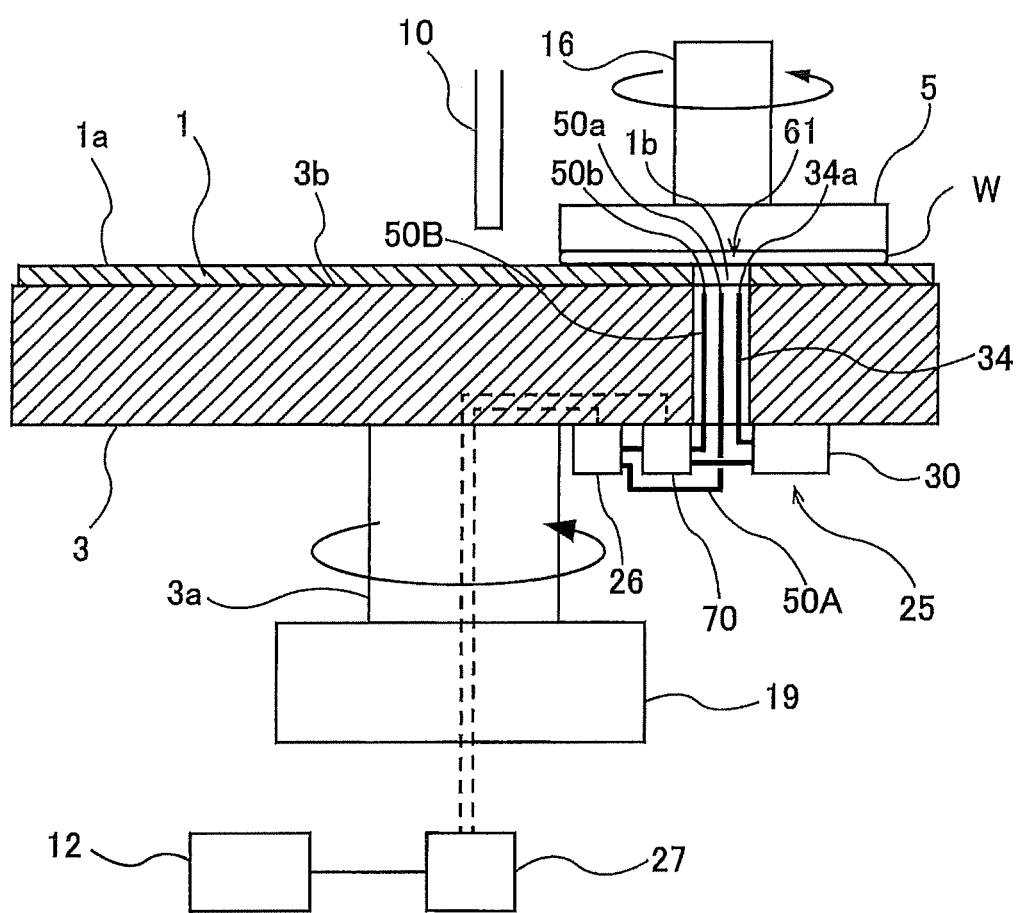
FIG. 1 is a view showing an embodiment of a polishing apparatus.

Embodiments will be described with reference to the drawings. FIG. 1 is a view showing an embodiment of a polishing apparatus. As shown in FIG. 1, the polishing apparatus includes a polishing table 3 supporting a polishing pad 1, a polishing head 5 for holding a wafer W and pressing the wafer W against the polishing pad 1 on the polishing table 3, a polishing-liquid supply nozzle 10 for supplying a polishing liquid (e.g., slurry) onto the polishing pad 1, and a polishing controller 12 for controlling polishing of the wafer W.

The polishing table 3 is coupled to a table motor 19 through a table shaft 3a, so that the polishing table 3 is rotated by the table motor 19 in a direction indicated by arrow. The table motor 19 is located below the polishing table 3. The polishing pad 1 is attached to an upper surface of the polishing table 3. The polishing pad 1 has an upper surface, which provides a polishing surface 1a for polishing the wafer W. The polishing head 5 is secured to a lower end of a polishing head shaft 16. The polishing head 5 is configured to be able to hold the wafer W on its lower surface by vacuum suction. The polishing head shaft 16 can be elevated and lowered by an elevating mechanism (not shown in the drawing).

Polishing of the wafer W is performed as follows. The polishing head 5 and the polishing table 3 are rotated in directions indicated by arrows, while the polishing liquid (or slurry) is supplied from the polishing-liquid supply nozzle 10 onto the polishing pad 1. In this state, the polishing head 5 presses the wafer W against the polishing surface 1a of the polishing pad 1. A surface of the wafer W is polished by a chemical action of the polishing liquid and a mechanical action of abrasive grains contained in the polishing liquid.

The polishing apparatus includes an optical film-thickness measuring device (i.e., film-thickness measuring apparatus) 25 for measuring a film thickness of the wafer W. This optical film-thickness measuring device 25 includes a light source 30 for emitting light, an illuminating fiber 34 having a distal end 34a disposed at a predetermined position in the polishing table 3, a first light-receiving fiber 50A having a distal end 50a disposed at the predetermined position in the polishing table 3, a second light-receiving fiber 50B having a plurality of distal ends 50b disposed around the distal end 50a of the first light-receiving fiber 50A, a spectrometer 26 for decomposing reflected light from the wafer W in accordance with wavelength and measuring an intensity of the reflected light at each of wavelengths, and a processor 27 for producing a spectral waveform indicating a relationship between the intensity and the wavelength of the reflected light and determining a film thickness of the wafer W based on the spectral waveform. In FIG. 1, an arrangement of the distal ends 34a, 50a, 50b of optical fibers 34, 50A, 50B is schematically depicted. The processor 27 is coupled to the polishing controller 12. In this embodiment, the polishing table 3 constitutes a wafer supporting structure for supporting the wafer W during measuring of the film thickness of the wafer W.

The distal ends 34a, 50a, 50b of the optical fibers 34, 50A, 50B are disposed so as not to project from a surface 3b of the polishing table 3. Distances from the surface 3b of the polishing table 3 to the distal ends 34a, 50a, 50b are substantially the same (within a range of 0 to 3 mm). Shapes of the distal ends 34a, 50a, 50b may be horizontal or inclined with respect to the surface 3b of the polishing table 3.

The illuminating fiber 34 is coupled to the light source 30 and disposed so as to direct the light, emitted by the light source 30, to the surface of the wafer W. The first light-receiving fiber 50A is coupled to the spectrometer 26, and the second light-receiving fiber 50B is coupled to an optical-path selecting mechanism 70. The optical-path selecting mechanism 70 is a device configured to optically connect and disconnect the second light-receiving fiber 50B and the spectrometer 26.

The distal end 34a of the illuminating fiber 34, the distal end 50a of the first light-receiving fiber 50A, and the distal ends 50b of the second light-receiving fiber 50B are adjacent to each other. These distal ends 34a, 50a, 50b constitute an optical sensor 61. The polishing pad 1 has a through-hole 1b located above the optical sensor 61, so that the optical sensor 61 can direct the light to the wafer W on the polishing pad 1 through the through-hole 1b and can receive the reflected light from the wafer W through the through-hole 1b. The through-hole 1b of the polishing pad 1 may be closed with a transparent material that allows the light to pass therethrough.

In one embodiment, the illuminating fiber 34 may have a plurality of distal ends disposed at different positions in the polishing table 3. The first light-receiving fiber 50A and the second light-receiving fiber 50B may also have a plurality of distal ends, respectively, disposed at the different positions in the polishing table 3. In this case also, each distal end of the illuminating fiber 34 and the distal ends of the light-receiving fibers 50A, 50B are disposed adjacent to each other, so that the distal ends of the illuminating fiber 34 and the distal ends of the light-receiving fibers 50A, 50B constitute a plurality of optical sensors for directing the light to the wafer W on the polishing pad 1 and receiving the reflected light from the wafer W.

Figure 2:
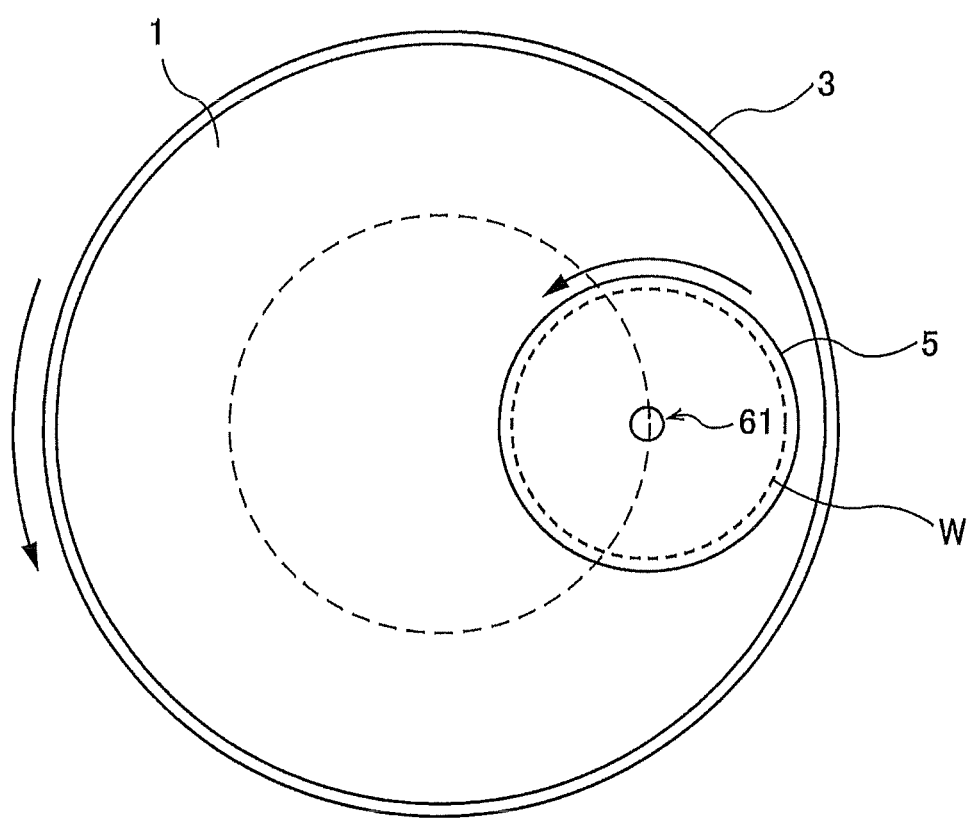
FIG. 2 is a plan view showing a polishing pad and a polishing table.

FIG. 2 is a plan view showing the polishing pad 1 and the polishing table 3. The optical sensor 61 sweeps across the wafer W each time the polishing table 3 makes one rotation. In this embodiment, a distance from a center of the polishing table 3 to the optical sensor 61 is equal to a distance from the center of the polishing table 3 to a center of the polishing head 5. Therefore, each time the polishing table 3 makes one rotation, the optical sensor 61 moves across the center of the wafer W, while directing the light to the wafer W and receiving the reflected light from the wafer W.

Referring back to FIG. 1, the optical-path selecting mechanism 70 and the spectrometer 26 are electrically connected to the processor 27. During polishing of the wafer W, the light is transmitted from the illuminating fiber 34 to the wafer W, and the reflected light from the wafer W is received by the first light-receiving fiber 50A (and the second light-receiving fiber 50B). The reflected light is transmitted to the spectrometer 26. The spectrometer 26 decomposes the reflected light in accordance with wavelength and measures the intensity of the reflected light at each of the wavelengths over a predetermined wavelength range, and sends the resulting light intensity data to the processor 27. This light intensity data is an optical signal that reflects the film thickness of the wafer W and is composed of the intensities of the reflected light and the corresponding wavelengths. The processor 27 produces, from the light intensity data, the spectral waveform that represents the intensity of the light at each of the wavelengths.

Figure 3:
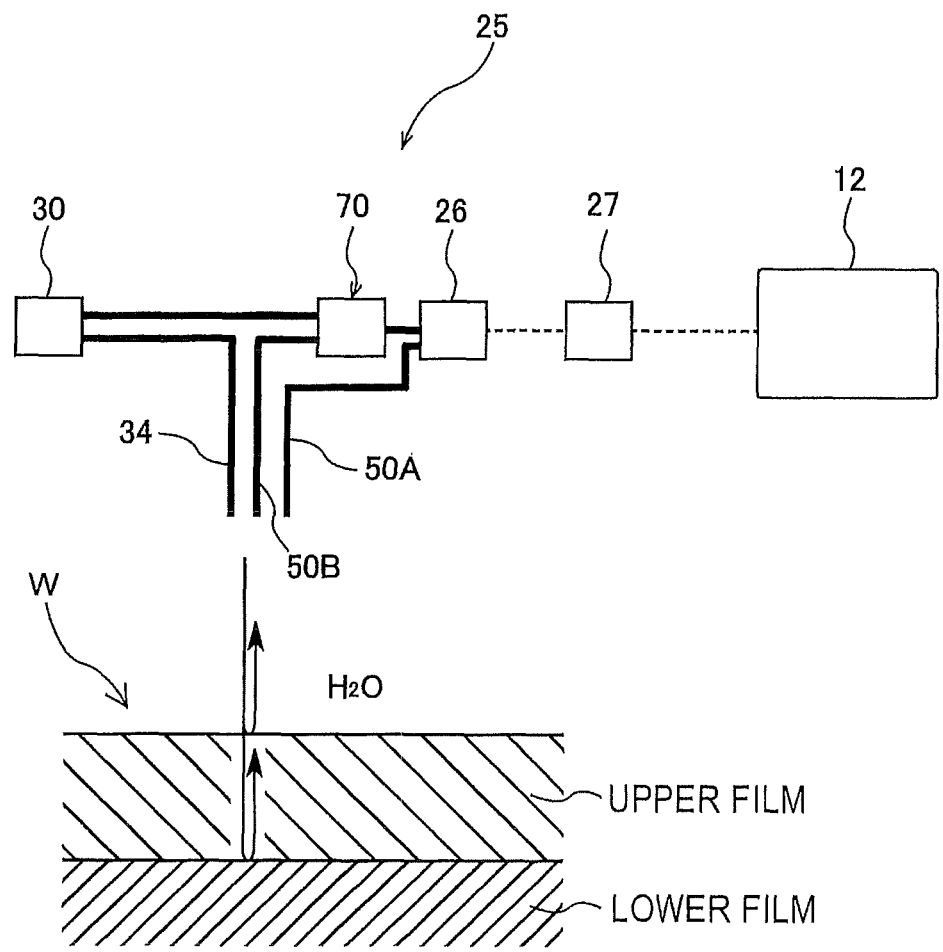
FIG. 3 is a schematic view for illustrating the principle of an optical film-thickness measuring device.

FIG. 3 is a schematic view for illustrating the principle of the optical film-thickness measuring device 25. In an example shown in FIG. 3, the wafer W has a lower film and an upper film formed on the lower film. The upper film is a film that can allow light to pass therethrough, such as a silicon layer or a dielectric film. The light that has been directed to the wafer W is reflected off an interface between a medium (e.g., water in the example of FIG. 3) and the upper film and an interface between the upper film and the lower film. Light waves from these interfaces interfere with each other. The manner of interference between the light waves varies depending on the thickness of the upper film (i.e., a length of an optical path). As a result, the spectral waveform, produced from the reflected light from the wafer, varies according to the thickness of the upper film.

The spectrometer 26 decomposes the reflected light in accordance with wavelength and measures the intensity of the reflected light at each of the wavelengths. The processor 27 produces the spectral waveform from the reflected-light intensity data (or optical signal) obtained by the spectrometer 26. This spectral waveform is expressed as a line graph indicating a relationship between the wavelength and the intensity of the light. The intensity of the light can also be expressed as a relative value, such as a relative reflectance which will be discussed later.

Figure 4:
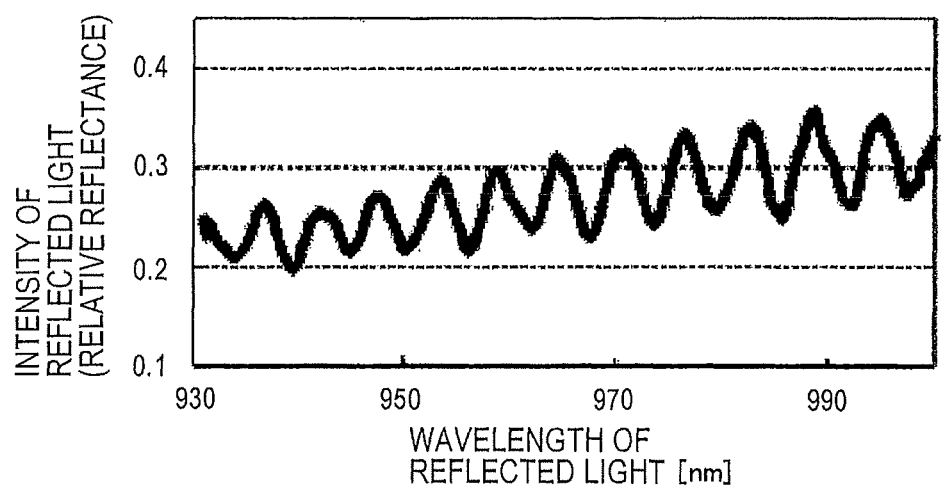
FIG. 4 is a graph showing an example of a spectral waveform.

FIG. 4 is a graph showing an example of the spectral waveform. In FIG. 4, vertical axis represents relative reflectance indicating the intensity of the reflected light from the wafer W, and horizontal axis represents wavelength of the reflected light. The relative reflectance is an index value that represents the intensity of the reflected light. The relative reflectance is a ratio of the intensity of the light to a predetermined reference intensity. By dividing the intensity of the light (i.e., the actually measured intensity) at each wavelength by a predetermined reference intensity, unwanted noises, such as a variation in the intensity inherent in an optical system or the light source of the apparatus, are removed from the actually measured intensity.

The reference intensity is an intensity of the light that has been measured in advance at each of the wavelengths. The relative reflectance is calculated at each of the wavelengths. Specifically, the relative reflectance is determined by dividing the intensity of the light (the actual intensity) at each wavelength by the corresponding reference intensity. The reference intensity is obtained by directly measuring the intensity of light emitted from the optical sensor 61, or by illuminating a mirror with light from the optical sensor 61 and measuring the intensity of the reflected light from the mirror. Alternatively, the reference intensity may be an intensity of reflected light from a silicon wafer measured by the spectrometer 26 when the silicon wafer (bare wafer) with no film thereon is being water-polished on the polishing pad 1 in the presence of water, or when the above-described silicon wafer (bare wafer) is placed on the polishing pad 1. In the actual polishing process, a dark level (which is a background intensity obtained under the condition that the light is cut off) is subtracted from the actually measured intensity to determine a corrected actually measured intensity. Further, the dark level is subtracted from the reference intensity to determine a corrected reference intensity. Then the relative reflectance is calculated by dividing the corrected actually measured intensity by the corrected reference intensity. That is, the relative reflectance $R(\lambda)$ can be calculated by using $$R(\lambda) = \frac{E(\lambda) - D(\lambda)}{B(\lambda) - D(\lambda)} \quad (1)$$

where $\lambda$ is wavelength, $E(\lambda)$ is the intensity at the wavelength $\lambda$ of the light reflected from the wafer, $B(\lambda)$ is the reference intensity at the wavelength $\lambda$, and $D(\lambda)$ is the background intensity (i.e., dark level) at the wavelength $\lambda$ measured under the condition that the light is cut off.

Figure 5:
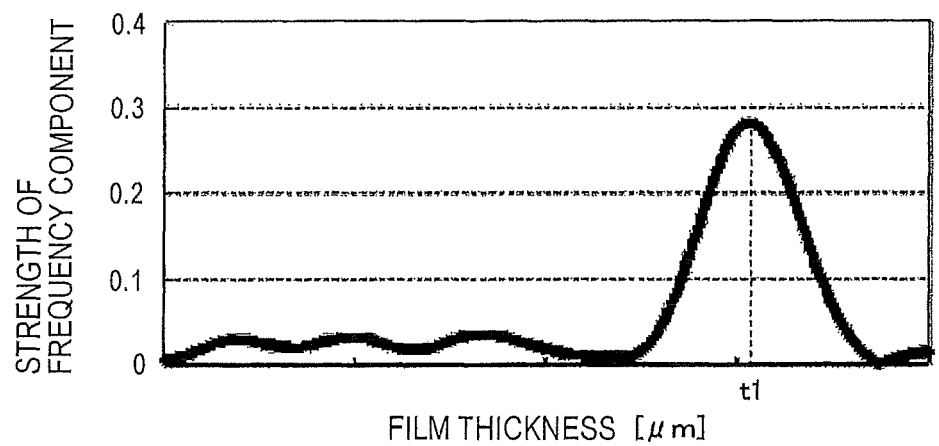
FIG. 5 is a graph showing a frequency spectrum obtained by performing a Fourier transform process on the spectral waveform shown in FIG. 4.

The processor 27 performs a Fourier transform process (e.g., fast Fourier transform process) on the spectral waveform to generate a frequency spectrum and determines a film thickness of the wafer W from the frequency spectrum. FIG. 5 is a graph showing the frequency spectrum obtained by performing the Fourier transform process on the spectral waveform shown in FIG. 4. In FIG. 5, vertical axis represents strength of a frequency component contained in the spectral waveform, and horizontal axis represents film thickness. The strength of a frequency component corresponds to amplitude of a frequency component which is expressed as sine wave. A frequency component contained in the spectral waveform is converted into a film thickness with use of a predetermined relational expression, so that the frequency spectrum as shown in FIG. 5 is generated. This frequency spectrum represents a relationship between the film thickness and the strength of the frequency component. The above-described predetermined relational expression is a linear function representing the film thickness and having the frequency component as variable. This linear function can be obtained from actual measurement results, an optical film-thickness measurement simulation, etc.

In the graph shown in FIG. 5, a peak of the strength of the frequency component appears at a film thickness t1. In other words, the strength of the frequency component becomes maximum at the film thickness of t1. That is, this frequency spectrum indicates that the film thickness is t1. In this manner, the processor 27 determines the film thickness corresponding to a peak of the strength of the frequency component.

The processor 27 outputs the film thickness t1 as a film-thickness measurement value to the polishing controller 12. The polishing controller 12 controls polishing operations (e.g., a polishing terminating operation) based on the film thickness t1 sent from the processor 27. For example, when the film thickness t1 reaches a preset target value, the polishing controller 12 terminates polishing of the wafer W.

Figure 6:
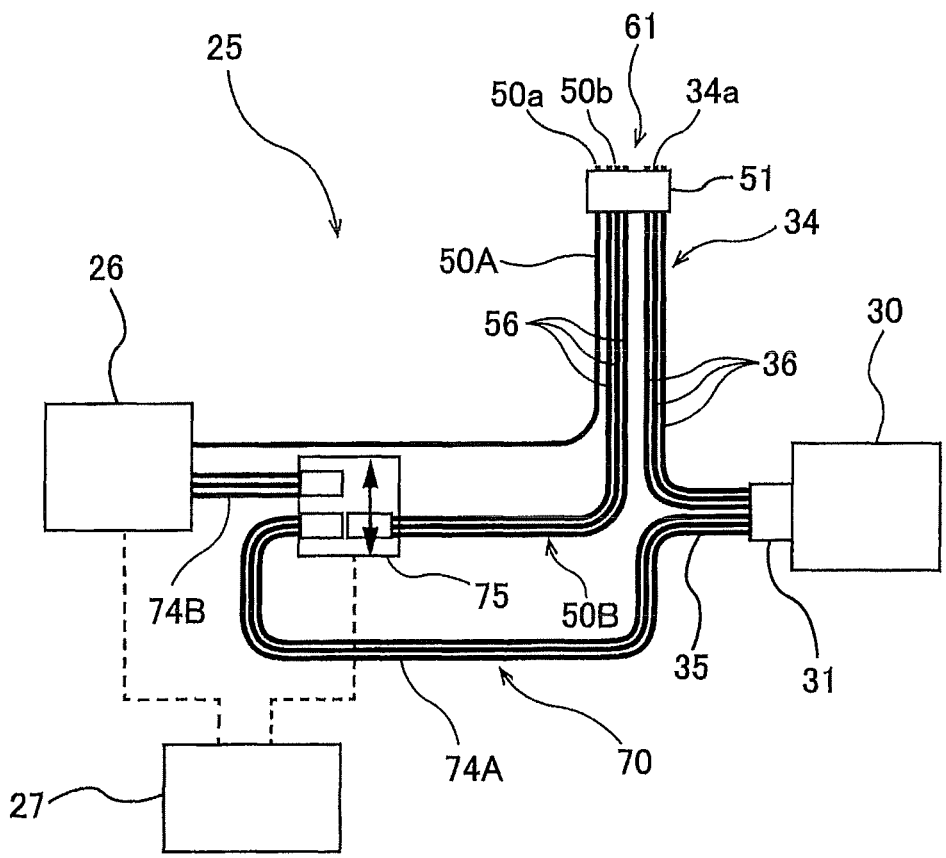
FIG. 6 is a schematic view showing an embodiment of the optical film-thickness measuring device (i.e., film-thickness measuring apparatus)

FIG. 6 is an enlarged view showing an embodiment of the optical film-thickness measuring device (i.e., film-thickness measuring apparatus) 25. The illuminating fiber 34 comprises a plurality of illuminating strand optical fibers 36. Distal ends of the illuminating strand optical fibers 36 constitute the distal end 34a of the illuminating fiber 34. Light-source-side ends of the illuminating strand optical fibers 36 are coupled to the light source 30. The distal end 50a of the first light-receiving fiber 50A, the distal end 34a of the illuminating fiber 34, and the distal ends 50b of the second light-receiving fiber 50B constitute the optical sensor 61. An opposite end of the first light-receiving fiber 50A is coupled to the spectrometer 26. The second light-receiving fiber 50B comprises a plurality of light-receiving strand optical fibers 56. Distal ends of the light-receiving strand optical fibers 56 constitute the distal ends 50b of the second light-receiving fiber 50B. The opposite end of the second light-receiving fiber 50B is coupled to the optical-path selecting mechanism 70. In this embodiment, the first light-receiving fiber 50A is constituted by one strand optical fiber.

The optical-path selecting mechanism 70 of this embodiment is an optical-path switching device that optically connects the second light-receiving fiber 50B to either the light source 30 or the spectrometer 26. The optical-path selecting mechanism 70 includes a first connection fiber 74A coupled to the light source 30, a second connection fiber 74B coupled to the spectrometer 26, and an optical switch 75 which connects the second light-receiving fiber 50B to either the first connection fiber 74A or the second connection fiber 74B. One end of the first connection fiber 74A is coupled to the light source 30, and the other end of the first connection fiber 74A is coupled to the optical switch 75. One end of the second connection fiber 74B is coupled to the spectrometer 26, and the other end of the second connection fiber 74B is coupled to the optical switch 75. The end of the second light-receiving fiber 50B is coupled to the optical switch 75.

The optical switch 75 includes an actuator such as a not-shown piezoelectric element. The actuator moves the end of the second light-receiving fiber 50B so as to face either end of the first connection fiber 74A or end of the second connection fiber 74B. When the end of the second light-receiving fiber 50B faces the end of the first connection fiber 74A, the second light-receiving fiber 50B is optically disconnected from the spectrometer 26 and optically connected to the light source 30. When the end of the second light-receiving fiber 50B faces the end of the second connection fiber 74B, the second light-receiving fiber 50B is optically disconnected from the light source 30 and optically connected to the spectrometer 26. The optical switch 75 is electrically connected to the processor 27, and an operation of the optical switch 75 is controlled by the processor 27.

In one embodiment, the actuator may move the first connection fiber 74A and the second connection fiber 74B together so that either the end of the first connection fiber 74A or the end of the second connection fiber 74B faces the end of the second light-receiving fiber 50B.

When the optical switch 75 is operated to optically connect the second light-receiving fiber 50B to the light source 30 through the first connection fiber 74A, the light emitted by the light source 30 is directed to the surface of the wafer W through the first connection fiber 74A and the second light-receiving fiber 50B. At this time, the second light-receiving fiber 50B serves as an illuminating fiber. When the optical switch 75 is operated to optically connect the second light-receiving fiber 50B to the spectrometer 26 through the second connection fiber 74B, the reflected light from the wafer W is transmitted to the spectrometer 26 through the second light-receiving fiber 50B and the second connection fiber 74B.

A part of the illuminating strand optical fibers 36 and a part of the first connection fiber 74A are bundled by a binder 31 to constitute a trunk fiber 35. The trunk fiber 35 is coupled to the light source 30. The other part of the illuminating strand optical fibers 36 and the other part of the first connection fiber 74A constitute branch fibers which branch off from the trunk fiber 35.

In the embodiment shown in FIG. 6, one trunk fiber 35 branches into two branch fibers; however, the trunk fiber 35 can branch into three or more branch fibers by adding a strand optical fiber. Furthermore, a diameter of the fiber can be easily increased by adding a strand optical fiber. Such fiber constituted by a large number of strand optical fibers has advantages that the fiber is easy to bend and is not easily broken.

The distal end 34a of the illuminating fiber 34 is constituted by the distal ends of the illuminating strand optical fibers 36. Hereinafter, the distal end 34a of the illuminating fiber 34 may be referred to as distal ends 34a of the illuminating fiber 34. The distal ends 50b of the second light-receiving fiber 50B are constituted by the distal ends of the light-receiving strand optical fibers 56. The distal ends 34a of the illuminating fiber 34, the distal end 50a of the first light-receiving fiber 50A, and the distal ends 50b of the second light-receiving fiber 50B are bundled by a binder 51 to constitute the optical sensor 61.

Figure 7:
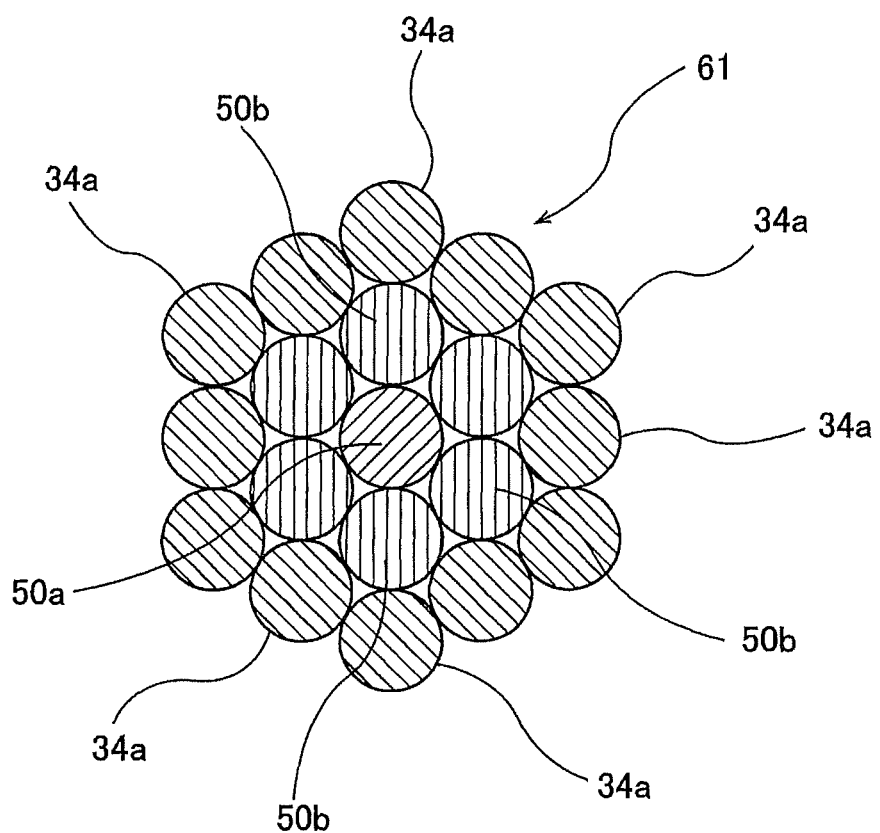
FIG. 7 is a view showing an example of an arrangement of distal ends of an illuminating fiber, a distal end of a first light-receiving fiber, and distal ends of a second light-receiving fiber which constitute an optical sensor.
Figure 7:
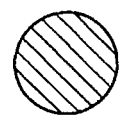
Figure 7:
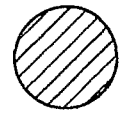
Figure 7:
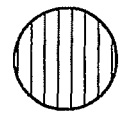

FIG. 7 is a view showing an example of an arrangement of the distal ends 34a of the illuminating fiber 34, the distal end 50a of the first light-receiving fiber 50A, and the distal ends 50b of the second light-receiving fiber 50B which constitute the optical sensor 61. The distal ends 50b of the second light-receiving fiber 50B are disposed around the distal end 50a of the first light-receiving fiber 50A, and are in contact with the distal end 50a of the first light-receiving fiber 50A. The distal ends 34a of the illuminating fiber 34 are disposed around the distal ends 50b of the second light-receiving fiber 50B.

Figure 8A:
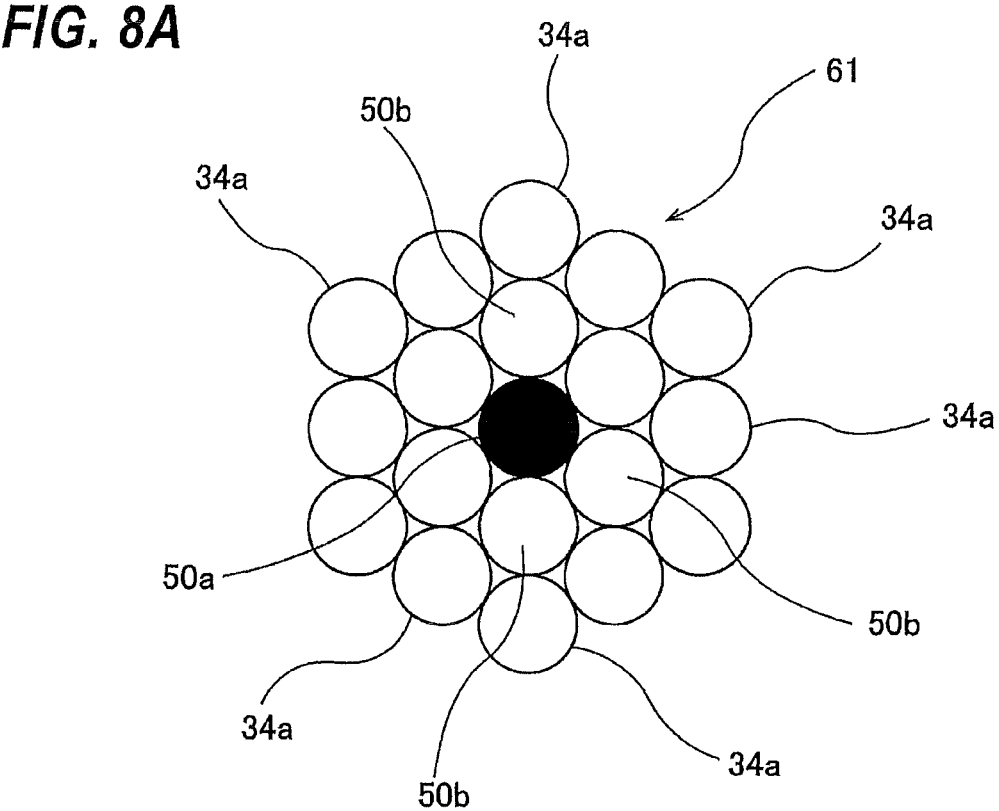
FIG. 8A and FIG. 8B are views for illustrating an arrangement of optical fiber for directing light to a wafer and optical fiber for receiving reflected light from the wafer.
Figure 8B:
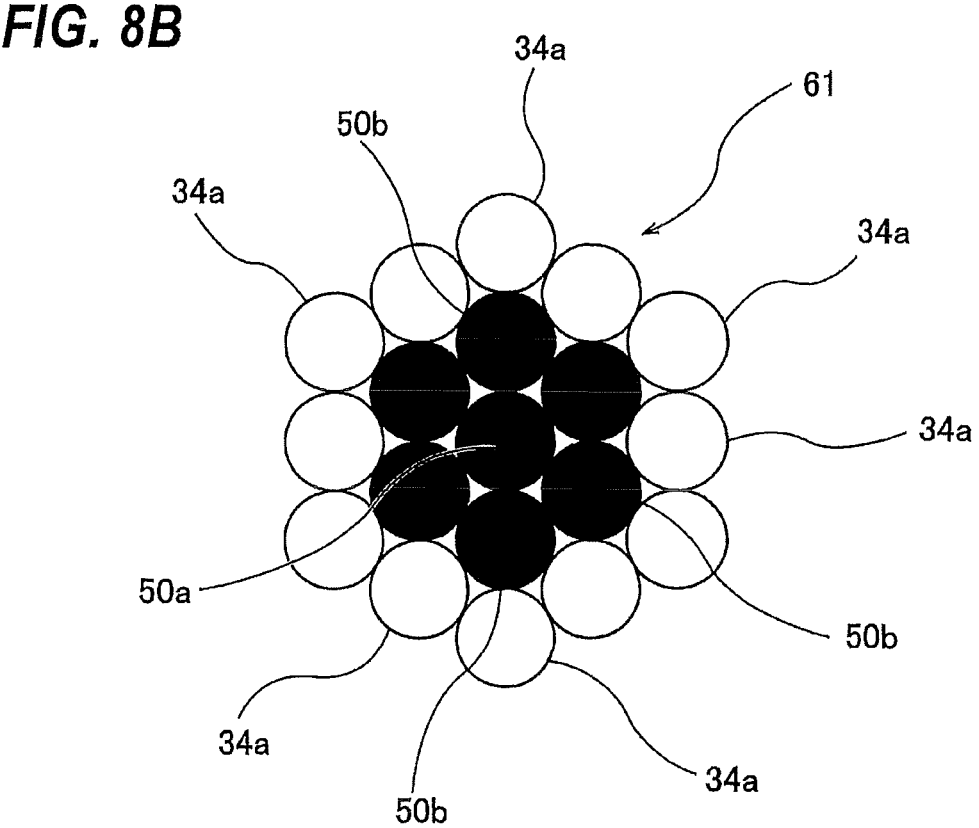

When the optical-path selecting mechanism 70 optically connects the second light-receiving fiber 50B to the light source 30, the second light-receiving fiber 50B serves as an illuminating fiber. As shown in FIG. 8A, the distal ends 50b of the second light-receiving fiber 50B direct the light to the wafer. In FIG. 8A and FIG. 8B, white circle represents optical fiber which directs the light to the wafer, and black circle represents optical fiber which receives the reflected light from the wafer. In the example shown in FIG. 8A, only the distal end 50a of the first light-receiving fiber 50A receives the reflected light, and the reflected light from the wafer is transmitted to the spectrometer 26 only through the first light-receiving fiber 50A.

When the light-path selecting mechanism 70 optically connects the second light-receiving fiber 50B to the spectrometer 26, as shown in FIG. 8B, the distal ends 50b of the second light-receiving fiber 50B receives the reflected light from the wafer. In an example of FIG. 8B, both the distal end 50a of the first light-receiving fiber 50A and the distal ends 50b of the second light-receiving fiber 50B receive the reflected light. The reflected light from the wafer is transmitted to the spectrometer 26 through both the first light-receiving fiber 50A and the second light-receiving fiber 50B.

As can be seen from comparison between FIG. 8A and FIG. 8B, the optical-pass selecting mechanism 70 can change a size (or area) of a light-receiving region of the optical sensor 61. In general, the size of the film-thickness measuring region depends on the size of the light-receiving region that receives the reflected light from the wafer. This embodiment can make it possible to select an appropriate size of the light-receiving region, i.e., the film-thickness measuring region, based on a type of structure, such as a device or a film formed on the surface of the wafer. As a result, the film-thickness measuring device 25 can measure an accurate film thickness.

Figure 9:
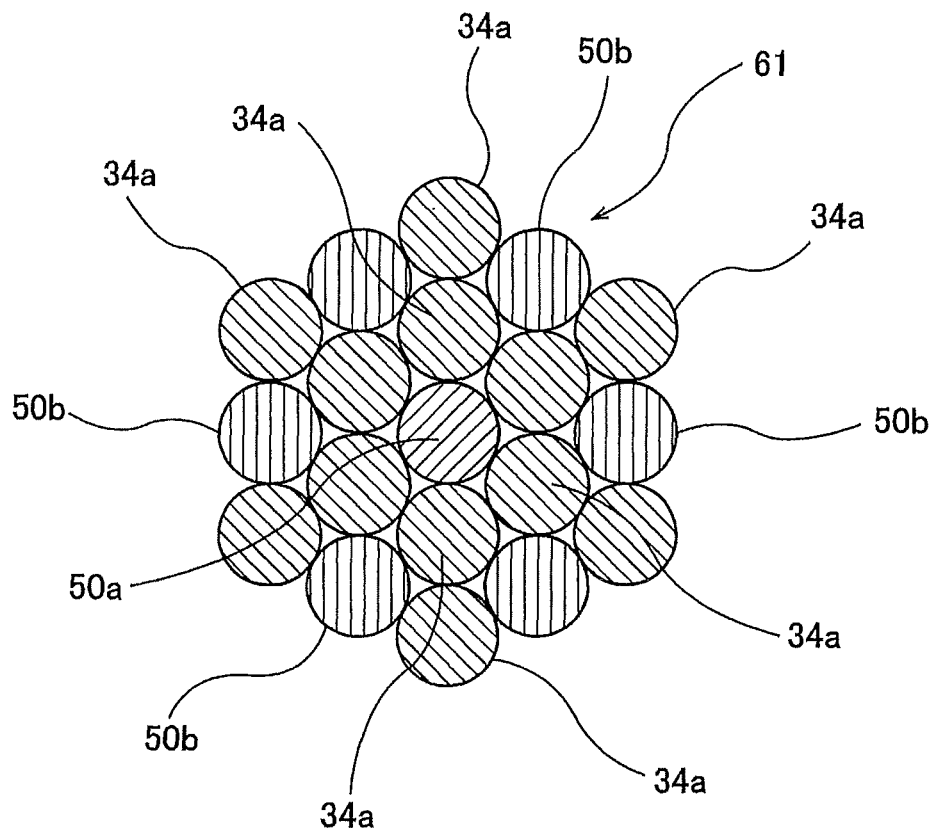
FIG. 9 is a view showing another example of the arrangement of the distal ends of the illuminating fiber, the distal end of the first light-receiving fiber, and the distal ends of the second light-receiving fiber which constitute the optical sensor.
Figure 9:
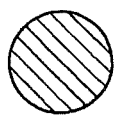
Figure 9:
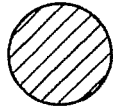
Figure 9:
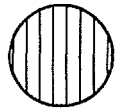

FIG. 9 is a view showing another example of the arrangement of the distal ends 34a of the illuminating fiber 34, the distal end 50a of the first light-receiving fiber 50A, and the distal ends 50b of the second light-receiving fiber 50B which constitute the optical sensor 61. This embodiment is the same as the embodiment shown in FIG. 7 in that the distal ends 50b of the second light-receiving fiber 50B are disposed around the distal end 50a of the first light-receiving fiber 50A, but is different in that the distal ends 50b of the second light-receiving fiber 50B are separated from the distal end 50a of the first light-receiving fiber 50A. The distal ends 34a of the illuminating fiber 34 are disposed around the distal end 50a of the first light-receiving fiber 50A.

Figure 10A:
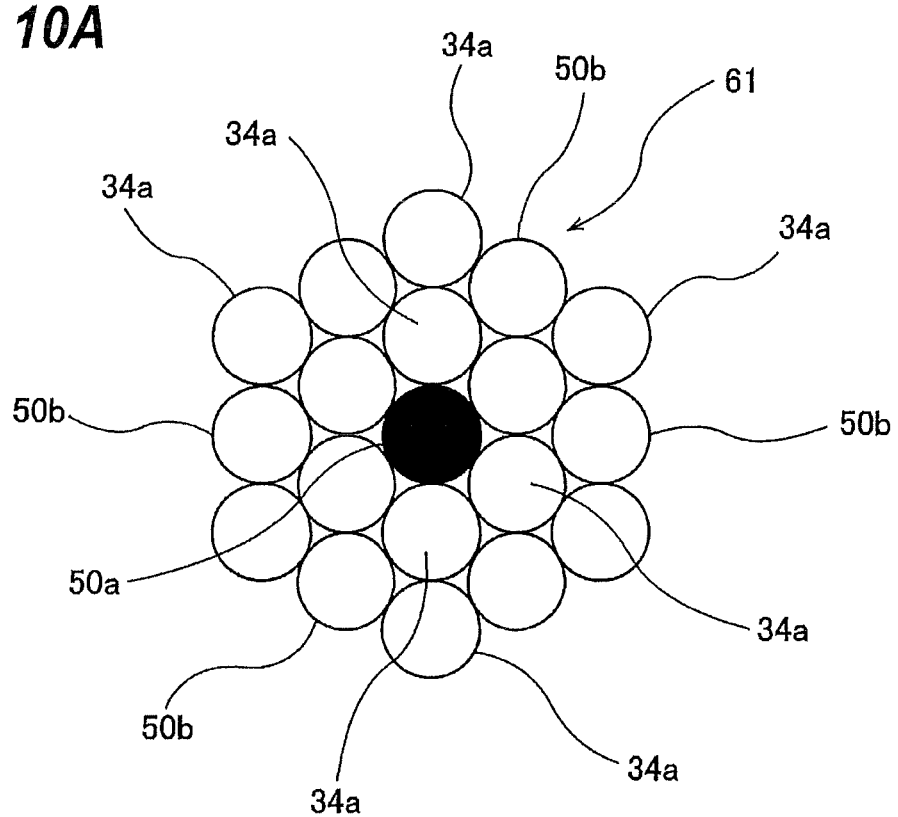
FIG. 10A and FIG. 10B are views for illustrating the arrangement of optical fiber for directing light to the wafer and optical fiber for receiving reflected light from the wafer.
Figure 10B:
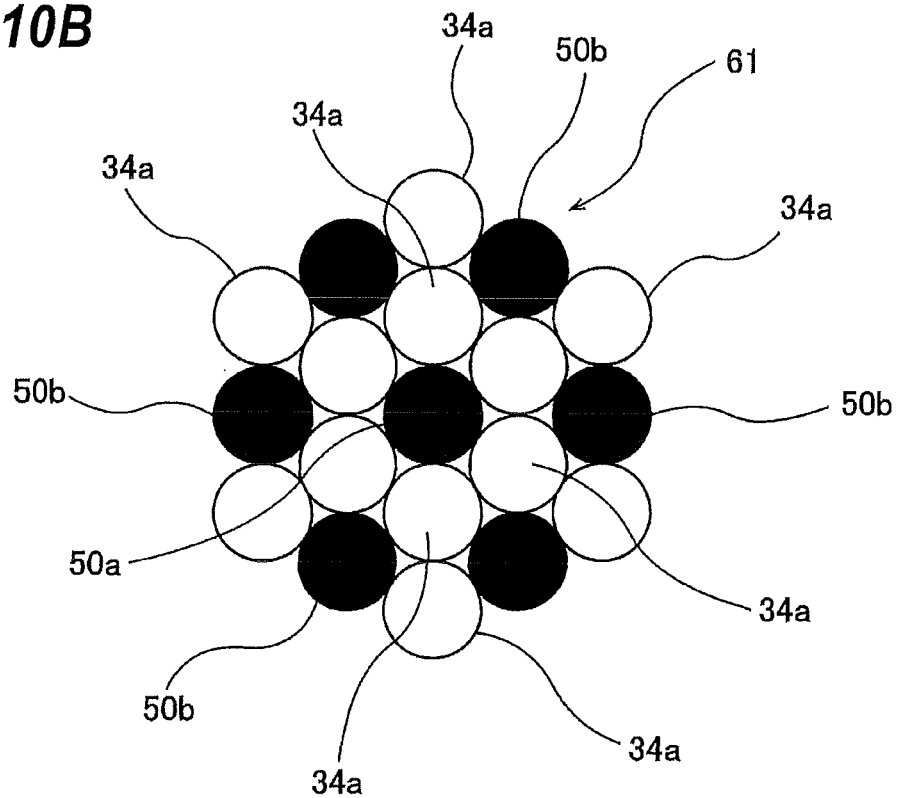

When the optical-path selecting mechanism 70 optically connects the second light-receiving fiber 50B to the light source 30, the second light-receiving fiber 50B serves as an illuminating fiber. As shown in FIG. 10A, the distal ends 50b of the second light-receiving fiber 50B direct the light to the wafer. In FIG. 10A and FIG. 10B, white circle represents optical fiber which directs the light to the wafer, and black circle represents optical fiber which receives the reflected light from the wafer. In the example shown in FIG. 10A, only the distal end 50a of the first light-receiving fiber 50A receives the reflected light. The reflected light from the wafer is transmitted to the spectrometer 26 only through the first light-receiving fiber 50A.

When the optical-path selecting mechanism 70 optically connects the second light-receiving fiber 50B to the spectrometer 26, the distal ends 50b of the second light-receiving fiber 50B receive the reflected light from the wafer as shown in FIG. 10B. In the example of FIG. 10B, both the distal end 50a of the first light-receiving fiber 50A and the distal ends 50b of the second light-receiving fiber 50B receive the reflected light. The reflected light from the wafer is transmitted to the spectrometer 26 through both the first light-receiving fiber 50A and the second light-receiving fiber 50B.

Also in this example, as can be seen from the comparison between FIG. 10A and FIG. 10B, the optical-path selecting mechanism 70 can change the size (or area) of the light-receiving region of the optical sensor 61. It is noted that the arrangements of the optical fibers shown in FIG. 7 and FIG. 9 are examples and the present invention is not limited to these examples.

Whether the second light-receiving fiber 50B is to be coupled to the light source 30 or the spectrometer 26 is determined in advance before polishing of the wafer based on the type of structure, such as a device or a film formed on the surface of the wafer. The processor 27 operates the optical-path selecting mechanism 70 before polishing of the wafer to couple the second light-receiving fiber 50B to the light source 30 or the spectrometer 26. The processor 27 may further operate the optical-path selecting mechanism 70 during polishing of the wafer to disconnect the second light-receiving fiber 50B from one of the light source 30 and the spectrometer 26 and couple the second light-receiving fiber 50B to the other. For example, when the upper film of the wafer is removed and the lower film is exposed, the processor 27 may operate the optical-path selecting mechanism 70 to disconnect the second light-receiving fiber 50B from the spectrometer 26 and couple the second light-receiving fiber 50B to the light source 30. Such operation makes it possible to accurately measure the film thickness based on the structure of the exposed surface of the wafer.

Figure 11:
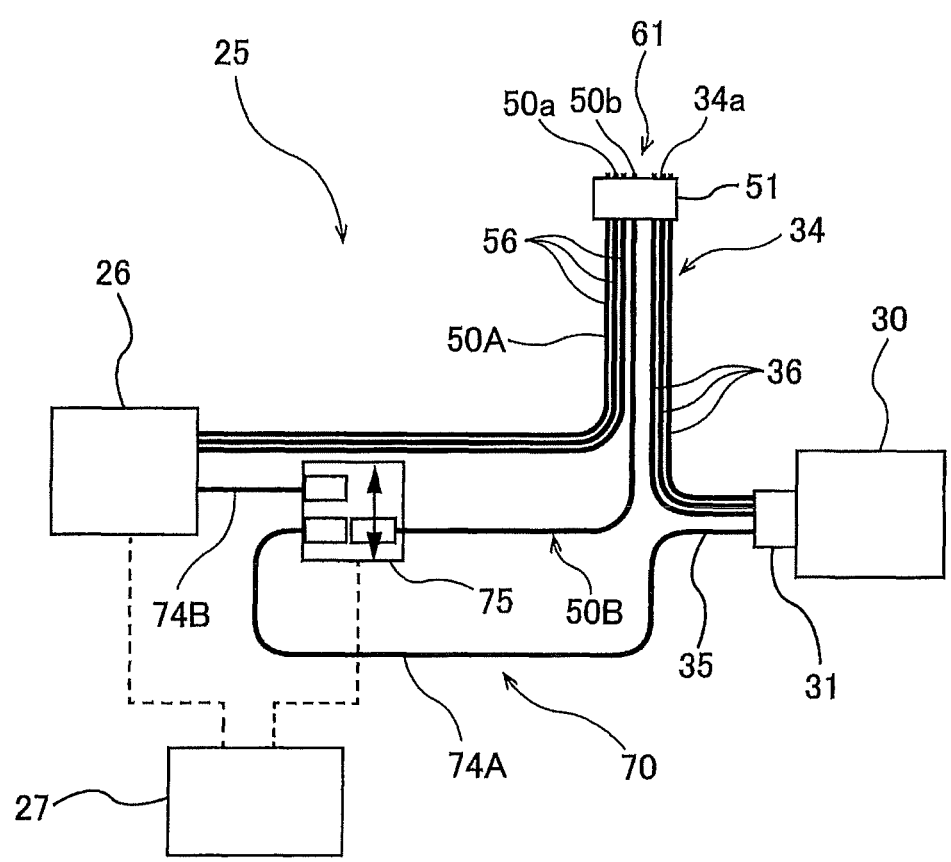
FIG. 11 is an enlarged view showing another embodiment of the optical film-thickness measuring device (i.e., film-thickness measuring apparatus)
Figure 12:
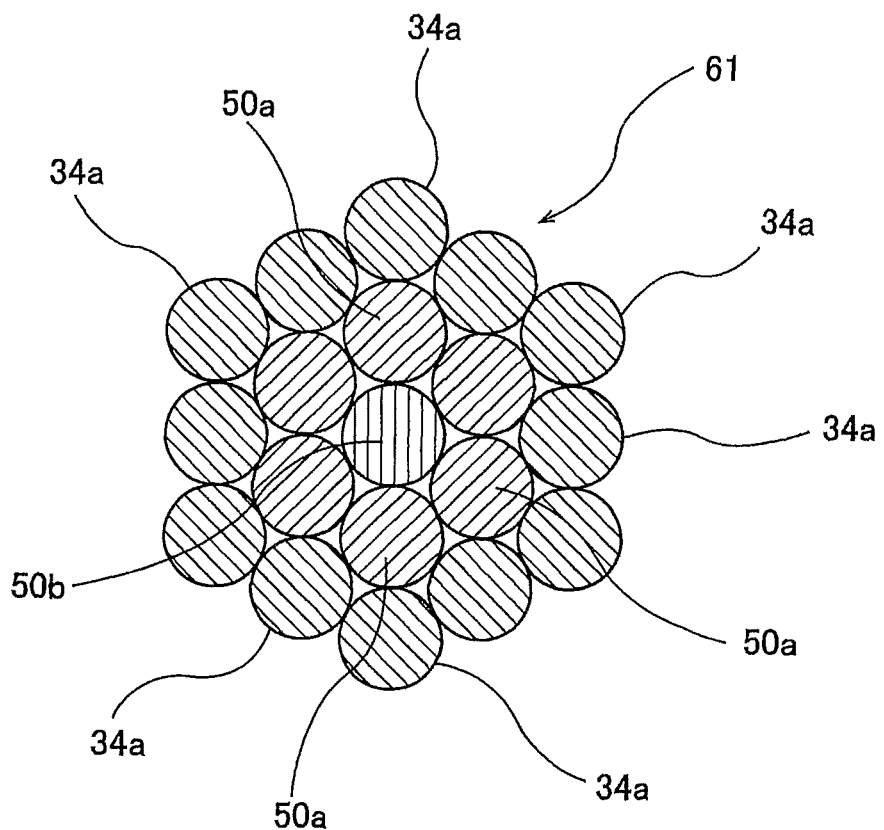
FIG. 12 is a view showing an embodiment of the arrangement of the distal ends of the illuminating fiber, distal ends of the first light-receiving fiber, and distal end of the second light-receiving fiber shown in FIG. 11.
Figure 12:
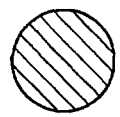
Figure 12:
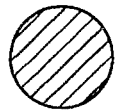
Figure 12:
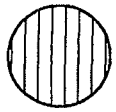
Figure 13:
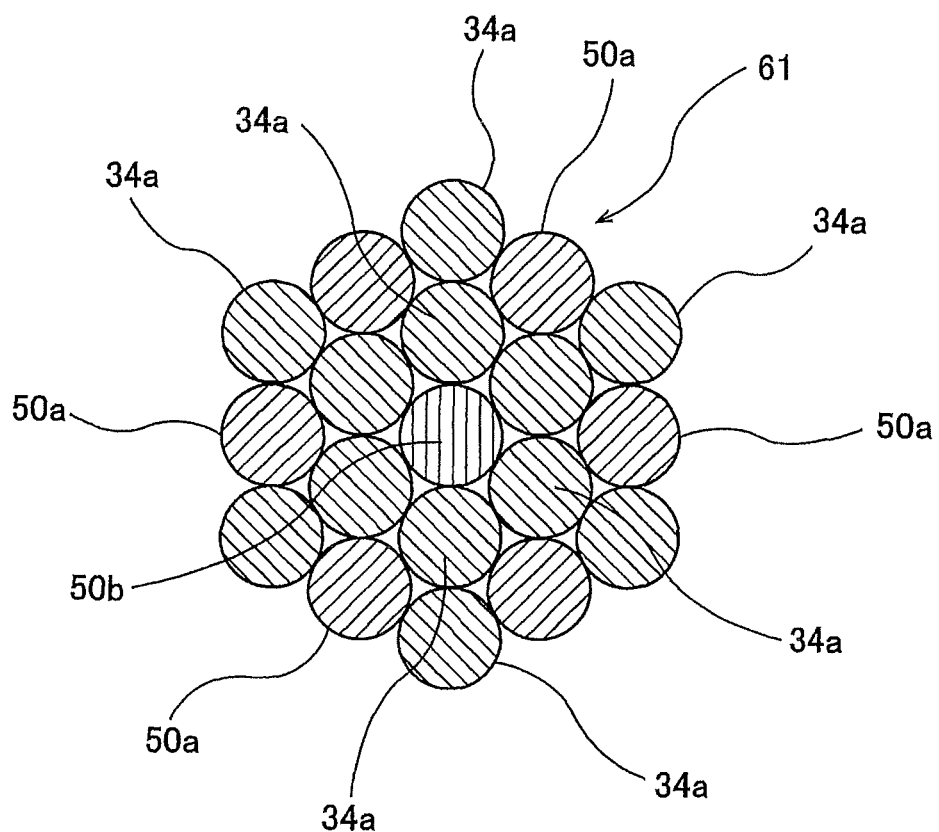
FIG. 13 is a view showing another embodiment of the arrangement of the distal ends of the illuminating fiber, distal ends of the first light-receiving fiber, and distal end of the second light-receiving fiber shown in FIG. 11.
Figure 13:
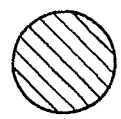
Figure 13:
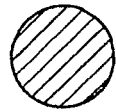
Figure 13:
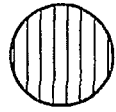

FIG. 11 is an enlarged view showing another embodiment of the optical film-thickness measuring device (i.e., film-thickness measuring apparatus) 25. FIG. 12 is a view showing an embodiment of the arrangement of the distal ends 34a of the illuminating fiber 34, distal ends 50a of the first light-receiving fiber 50A, and distal end 50b of the second light-receiving fiber 50B shown in FIG. 11. FIG. 13 is a view showing another embodiment of the arrangement of the distal ends 34a of the illuminating fiber 34, distal ends 50a of the first light-receiving fiber 50A, and distal end 50b of the second light-receiving fiber 50B shown in FIG. 11. Structural and operational details of this embodiment, which will not be described in particular, are identical to those of the embodiment shown in FIG. 1 to FIG. 10, and hence their repetitive descriptions will be omitted.

In the embodiments shown in FIG. 11 to FIG. 13, the first light-receiving fiber 50A has a plurality of distal ends 50a. These distal ends 50a are disposed around the distal end 50b of the second light-receiving fiber 50B. Also in these embodiments, the processor 27 operates the optical-path selecting mechanism 70 to couple the second light-receiving fiber 50B to the light source 30 or the spectrometer 26. As a result, the size (or area) of the light-receiving region of the optical sensor 61 can be changed.

Figure 14:
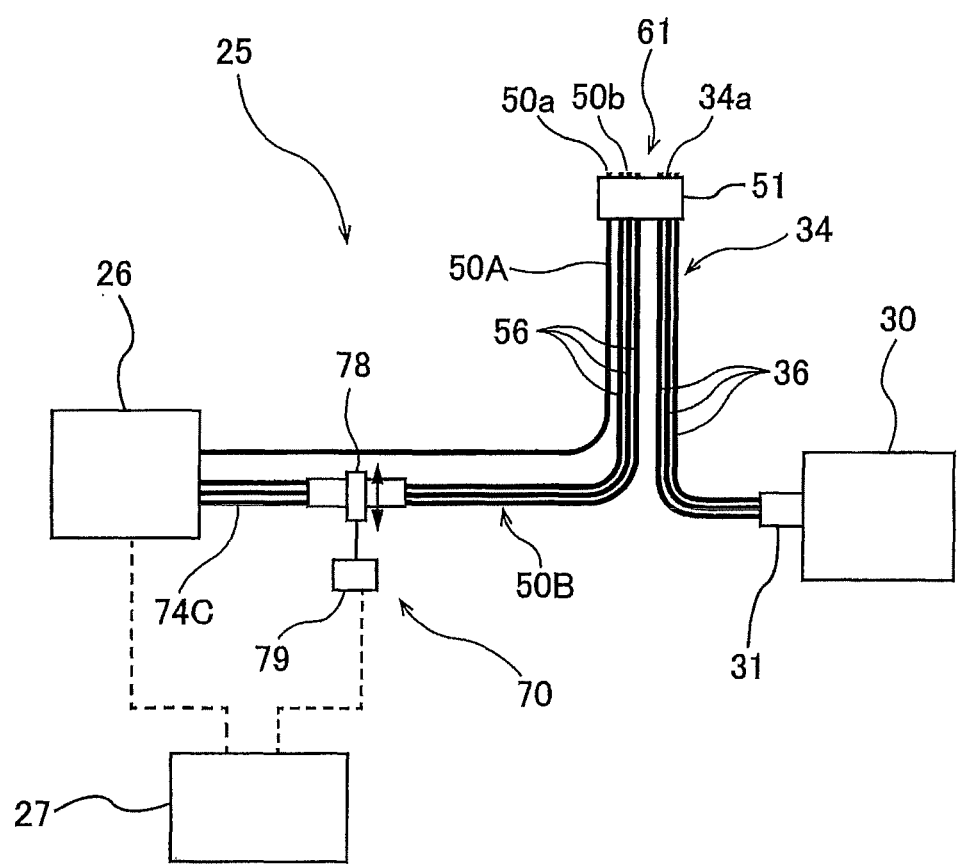
FIG. 14 is a view showing another embodiment of an optical-path selecting mechanism.

FIG. 14 is a view showing another embodiment of the optical-path selecting mechanism 70. Structural and operational details of the present embodiment, which will not be described in particular, are identical to those of the embodiment shown in FIG. 6, and hence their repetitive descriptions will be omitted. In this embodiment, the optical-path selecting mechanism 70 is a shutter mechanism disposed between the spectrometer 26 and the second light-receiving fiber 50B. The optical-path selecting mechanism 70, serving as a shutter mechanism, includes a connection fiber 74C coupled to the spectrometer 26, a shutter 78 disposed between the second light-receiving fiber 50B and the connection fiber 74C, and an actuator 79 for opening and closing the shutter 78.

One end of the connection fiber 74C is coupled to the spectrometer 26, and the other end of the connection fiber 74C faces the end of the second light-receiving fiber 50B. A gap exists between the end of the connection fiber 74C and the end of the second light-receiving fiber 50B. A position at which the shutter 78 is located in this gap is a position at which the shutter 78 is closed. A position at which the shutter 78 is located outside of the gap is a position at which the shutter 78 is opened. The shutter 78 may be a slide type, a rotary type having a rotary plate in which a through-hole is formed, or a diaphragm type having a plurality of blades. In one embodiment, the connection fiber 74C may be omitted, and the shutter 78 may be disposed on the spectrometer 26.

When the actuator 79 opens the shutter 78, the second light-receiving fiber 50B is optically connected to the connection fiber 74C. When the actuator 79 closes the shutter 78, the second light-receiving fiber 50B is optically disconnected from the connection fiber 74C. More specifically, when the shutter 78 is located away from the second light-receiving fiber 50B and the connection fiber 74C (i.e., when the shutter 78 is opened), the second light-receiving fiber 50B is optically connected to the spectrometer 26 through the connection fiber 74C. When the shutter 78 is located between the second light-receiving fiber 50B and the connection fiber 74C (i.e., the shutter 78 is closed), the second light-receiving fiber 50B is optically disconnected from the spectrometer 26. The actuator 79 is electrically connected to the processor 27, and an operation of the actuator 79 is controlled by the processor 27.

Figure 15A:
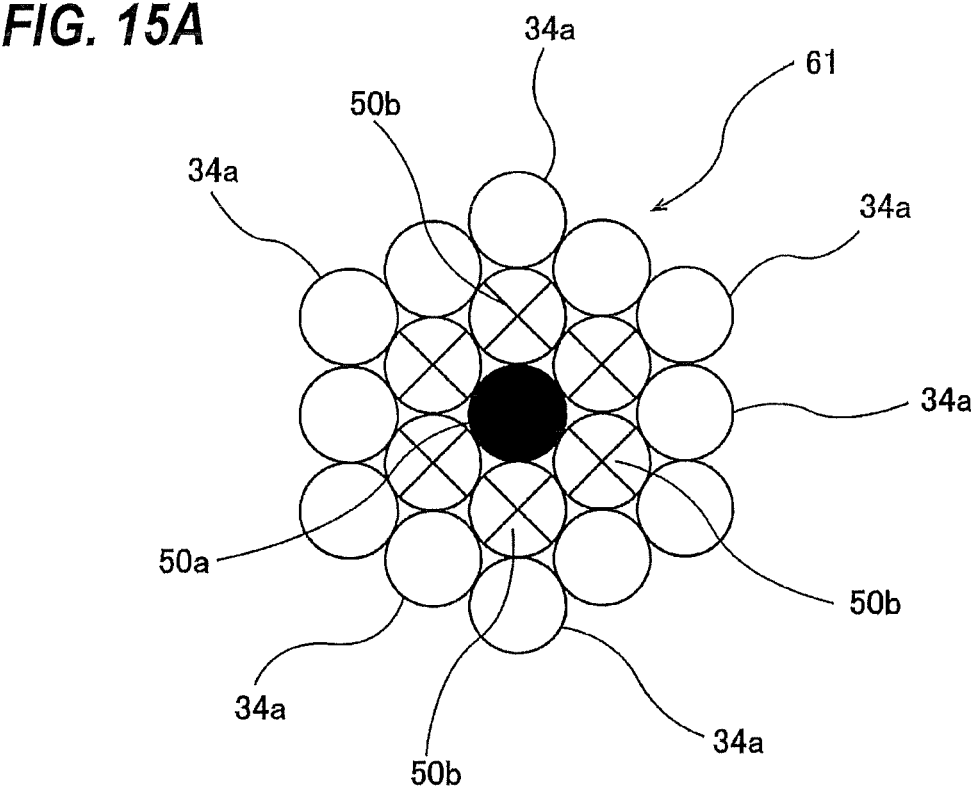
FIG. 15A is a diagram for illustrating a role of each optical fiber when a shutter is closed in the case of the arrangement of the optical fibers shown in FIG. 7.
Figure 15B:
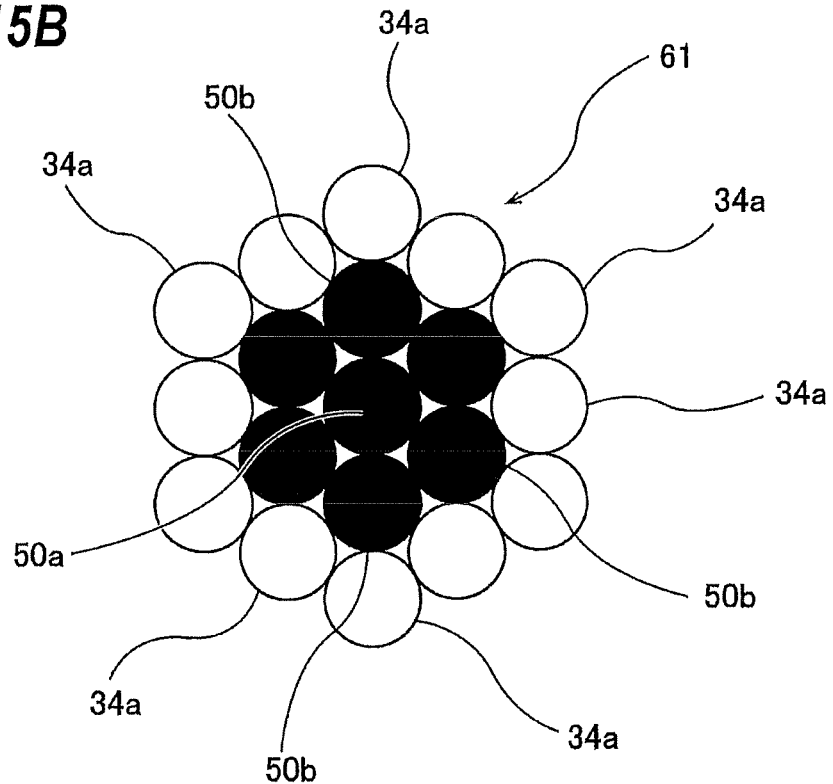
FIG. 15B is a diagram for illustrating a role of each optical fiber when the shutter is opened in the case of the arrangement of the optical fibers shown in FIG. 7.

FIG. 15A is a view for illustrating a role of each optical fiber when the shutter 78 is closed in the case of the arrangement of the optical fibers shown in FIG. 7. When the shutter 78 is closed and the second light-receiving fiber 50B is disconnected from the spectrometer 26, the reflected light from the wafer is intercepted by the shutter 78 and does not reach the spectrometer 26. In FIG. 15A and FIG. 15B, white circle represents an optical fiber which directs the light to the wafer, black circle represents an optical fiber which directs the reflected light from the wafer to the spectrometer 26, and circle symbol marked with "×" represents an optical fiber in which the reflected light is intercepted by the shutter 78. In the example shown in FIG. 15A, only the distal end 50a of the first light-receiving fiber 50A receives the reflected light, and the reflected light from the wafer is transmitted to the spectrometer 26 only through the first light-receiving fiber 50A.

FIG. 15B is a view for illustrating a role of each optical fiber when the shutter 78 is opened in the case of the arrangement of the optical fibers shown in FIG. 7. When the shutter 78 is opened and the second light-receiving fiber 50B is connected to the spectrometer 26, the reflected light from the wafer passes through the second light-receiving fiber 50B to reach the spectrometer 26. In the example shown in FIG. 15B, both the distal end 50a of the first light-receiving fiber 50A and the distal ends 50b of the second light-receiving fiber 50B receive the reflected light, and the reflected light from the wafer is transmitted to the spectrometer 26 through both the first light-receiving fiber 50A and the second light-receiving fiber 50B.

As can be seen from the comparison between FIG. 15A and FIG. 15B, the light-path selecting mechanism 70 having the shutter 78 can change the size (or area) of the light-receiving region of the optical sensor 61.

Figure 16A:
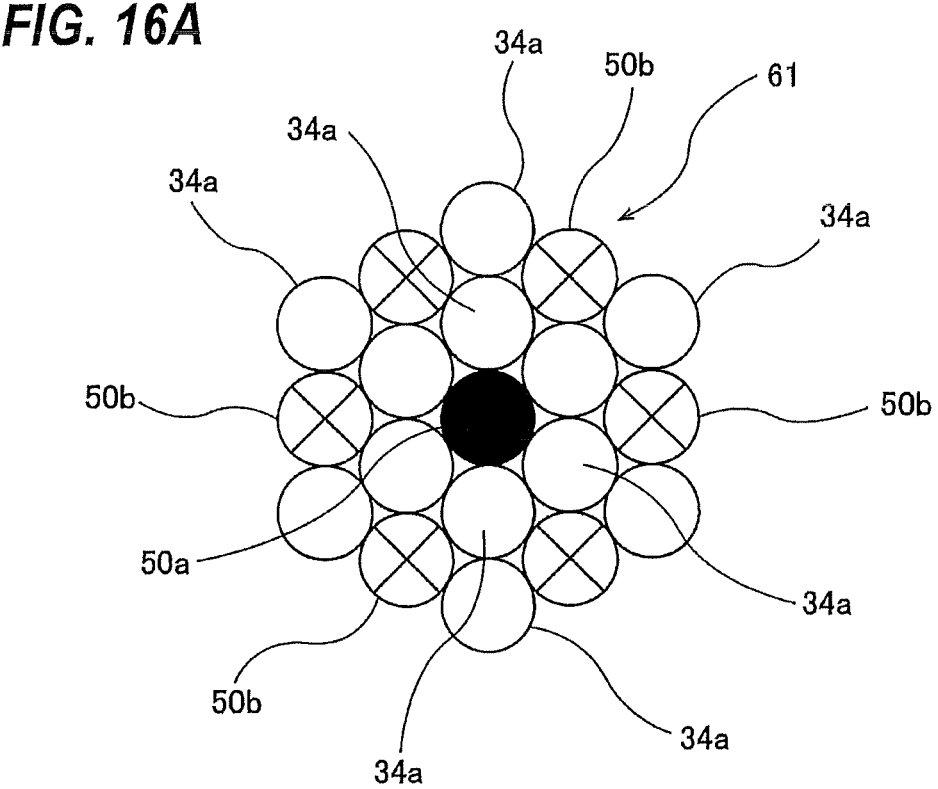
FIG. 16A is a diagram for illustrating a role of each optical fiber when the shutter is closed in the case of the arrangement of the optical fibers shown in FIG. 9.

FIG. 16A is a view for illustrating a role of each optical fiber when the shutter 78 is closed in the case of the arrangement of the optical fibers shown in FIG. 9. When the shutter 78 is closed to disconnect the second light-receiving fiber 50B from the spectrometer 26, the reflected light from the wafer is intercepted by the shutter 78 and does not reach the spectrometer 26. In FIG. 16A, white circle represents optical fiber which directs the light to the wafer, black circle represents optical fiber which directs the reflected light from the wafer to the spectrometer 26, and circle symbol marked with "×" represents optical fiber in which the reflected light is intercepted by the shutter 78. In the example shown in FIG. 16A, only distal end 50a of the first light-receiving fiber 50A receives the reflected light, and the reflected light from the wafer is transmitted to the spectrometer 26 only through the first light-receiving fiber 50A.

Figure 16B:
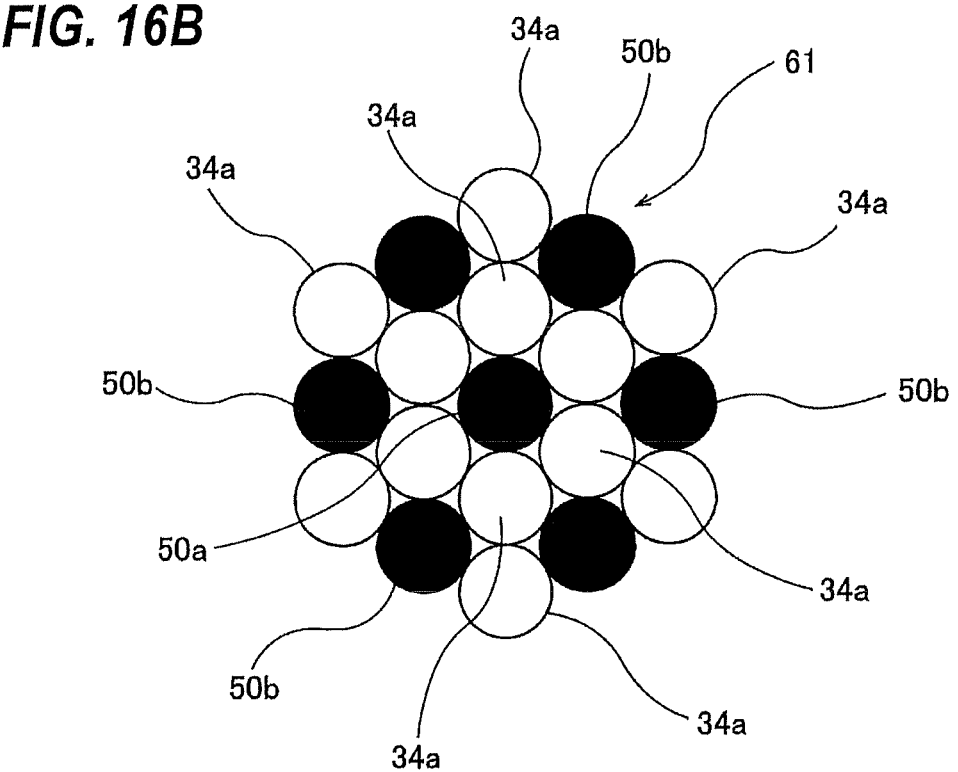
FIG. 16B is a diagram for illustrating a role of each optical fiber when the shutter is opened in the case of the arrangement of the optical fibers shown in FIG. 9.

FIG. 16B is a view for illustrating a role of each optical fiber when the shutter 78 is opened in the case of the arrangement of the optical fibers shown in FIG. 9. When the shutter 78 is opened to allow the second light-receiving fiber 50B to be connected to the spectrometer 26, the reflected light from the wafer passes through the second light-receiving fiber 50B to reach the spectrometer 26. In the example of FIG. 16B, both the distal end 50a of the first light-receiving fiber 50A and the distal ends 50b of the second light-receiving fiber 50B receive the reflected light, and the reflected light from the wafer is transmitted to the spectrometer 26 through both the first light-receiving fiber 50A and the second light-receiving fiber 50B.

As can be seen from the comparison between FIG. 16A and FIG. 16B, the light-path selecting mechanism 70 having the shutter 78 can change the size (or area) of the light-receiving region of the optical sensor 61.

Figure 17:
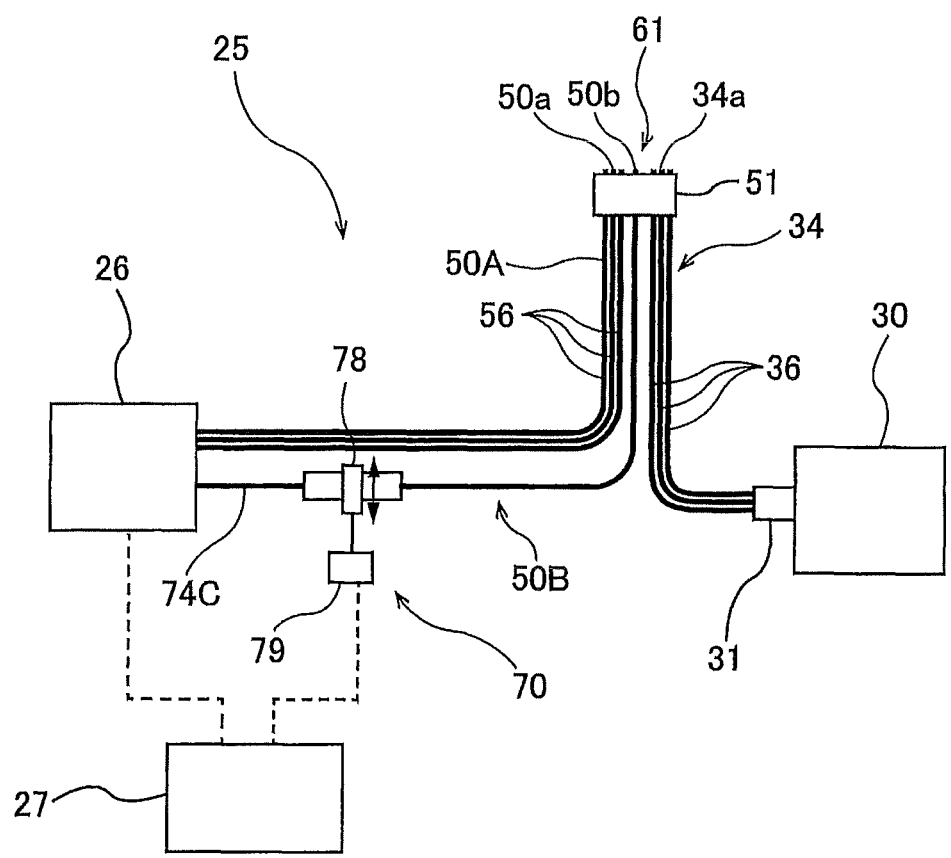
FIG. 17 is an enlarged view showing another embodiment of the optical film-thickness measuring device (i.e., film-thickness measuring apparatus)

FIG. 17 is an enlarged view showing another embodiment of the optical film-thickness measuring device (i.e., film-thickness measuring apparatus) 25. Structural and operational details of this embodiment, which will not be described in particular, are identical to those of the embodiment shown in FIG. 14 to FIG. 16, and hence their repetitive descriptions will be omitted. In this embodiment shown in FIG. 17, the first light-receiving fiber 50A has a plurality of distal ends 50a, and these distal ends 50a are disposed around the distal end 50b of the second light-receiving fiber 50B. The arrangements of the distal ends 34a of the illuminating fiber 34, the distal ends 50a of the first light-receiving fiber 50A, and the distal end 50b of the second light-receiving fiber 50B shown in FIG. 12 and FIG. 13 can also be applied to the arrangement of the embodiment shown in FIG. 17. Also in this embodiment, the processor 27 can operate the shutter 78 of the optical-path selecting mechanism 70 to change the size (or area) of the light-receiving region of the optical sensor 61.

Figure 18:
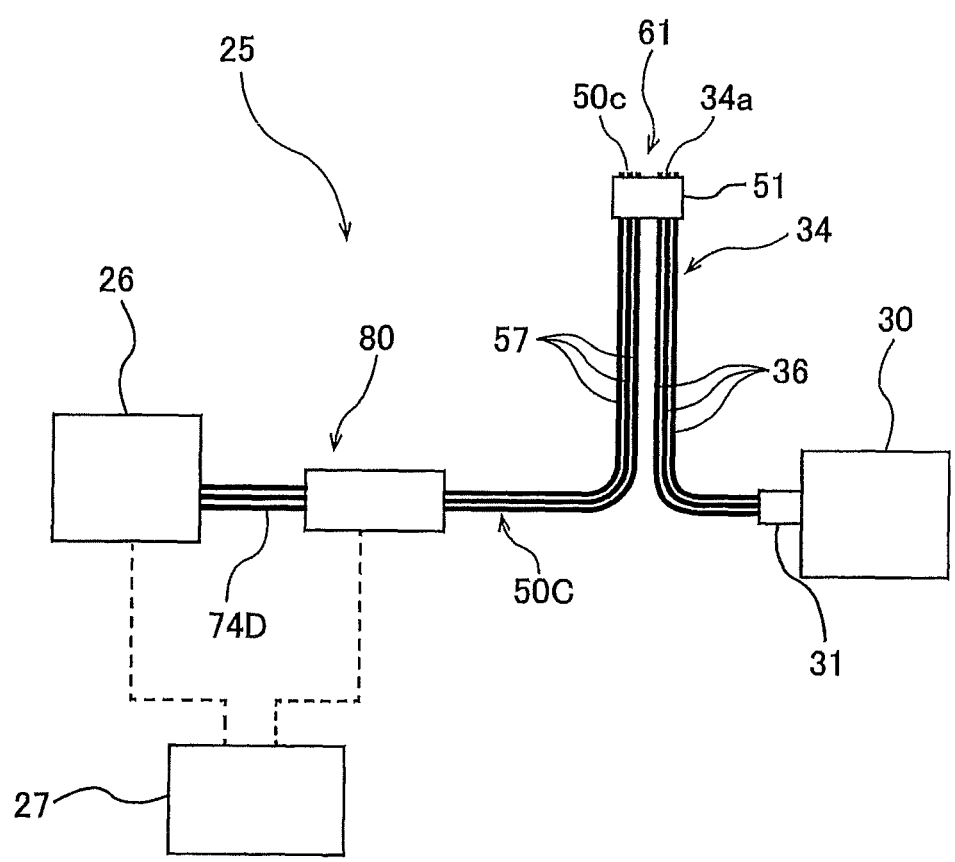
FIG. 18 is an enlarged view showing another embodiment of the optical film-thickness measuring device (i.e., film-thickness measuring apparatus)

FIG. 18 is an enlarged view showing another embodiment of the optical film-thickness measuring device (i.e., film-thickness measuring apparatus) 25. Structural and operational details of this embodiment, which will not be described in particular, are identical to those of the embodiment shown in FIG. 14, and hence their repetitive descriptions will be omitted. In this embodiment, the film-thickness measuring device 25 includes a light-receiving fiber 50C, instead of the first light-receiving fiber 50A and the second light-receiving fiber 50B.

The light-receiving fiber 50C has a plurality of light-receiving strand optical fibers 57. Distal ends of the light-receiving strand optical fibers 57 constitute distal ends 50c of the light-receiving fiber 50C. An opposite end of the light-receiving fiber 50C is coupled to a köhler optical system 80. The distal ends 34a of the illuminating fiber 34 and the distal ends 50c of the light-receiving fiber 50C are adjacent to each other. The distal ends 34a, 50c are bundled by the binder 51 to constitute the optical sensor 61. During polishing of the wafer, the reflected light of the wafer is transmitted to the spectrometer 26 through the light-receiving fiber 50C and the köhler optical system 80. The köhler optical system 80 is an example of an optical system having a field stop whose degree of opening is variable.

Figure 19:
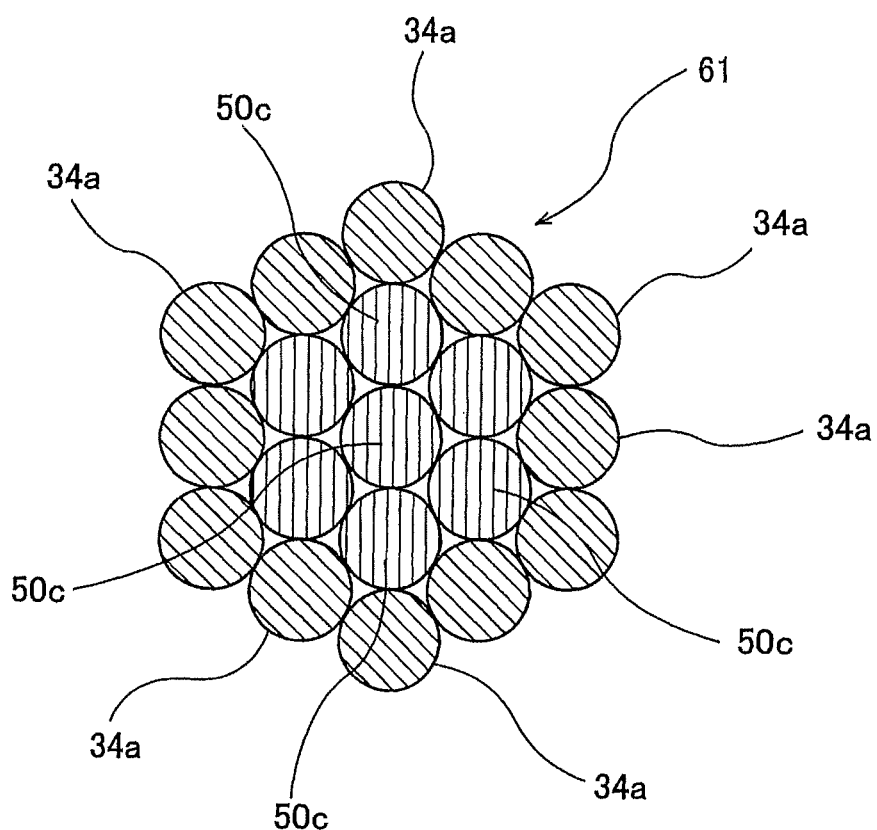
FIG. 19 is a view showing an example of the arrangement of the distal ends of the illuminating fiber and the distal ends of the light-receiving fiber which constitute the optical sensor.
Figure 19:
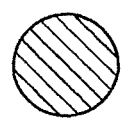
Figure 19:
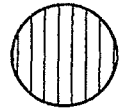

FIG. 19 is a view showing an example of the arrangement of the distal ends 34a of the illuminating fiber 34 and the distal ends 50c of the light-receiving fiber 50C which constitute the optical sensor 61. In this example, the distal ends 34a of the illuminating fiber 34 are arranged around the distal ends 50c of the light-receiving fiber 50C.

Figure 20:
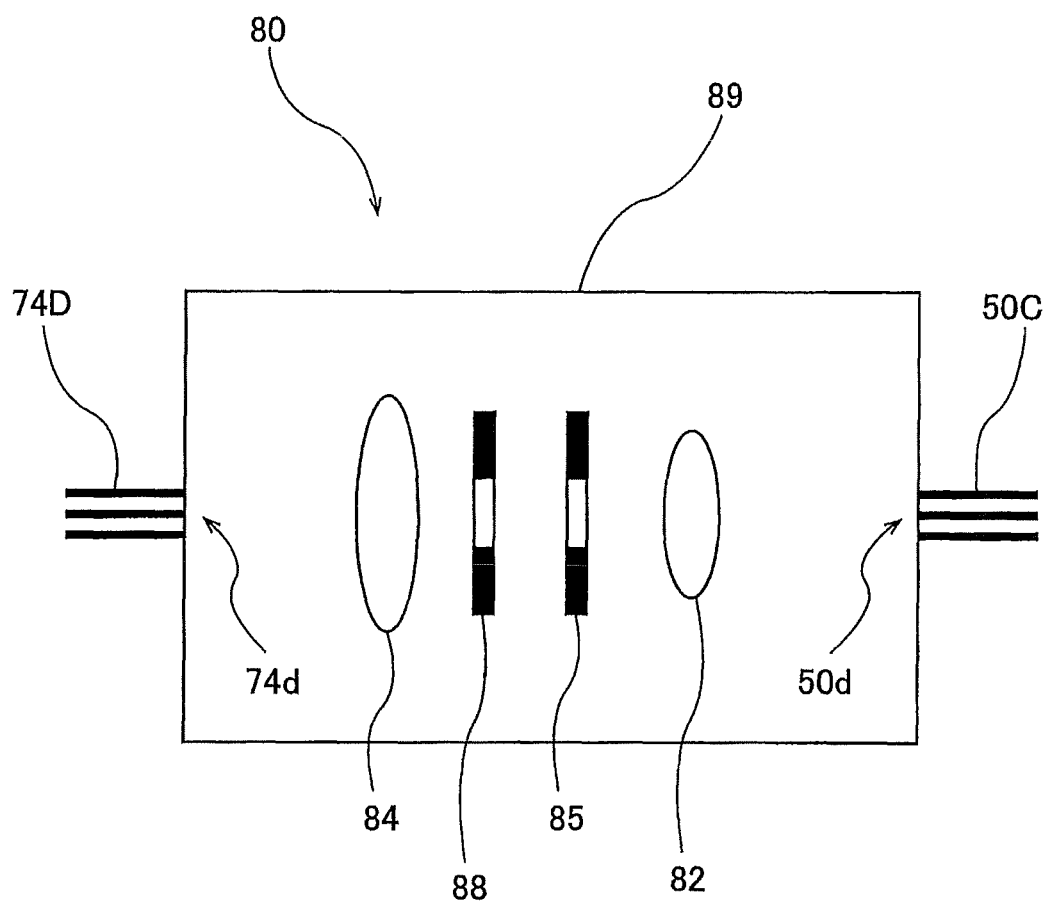
FIG. 20 is a schematic view of a köhler optical system shown in FIG. 18.

FIG. 20 is a schematic view of the köhler optical system 80 shown in FIG. 18. As shown in FIG. 20, the köhler optical system 80 includes a connection fiber 74D coupled to the spectrometer 26, a collector lens 82 facing an end portion 50d of the light-receiving fiber 50C, a condenser lens 84 facing an end portion 74d of the connection fiber 74D, and a field stop 85 and an aperture stop 88 disposed between the collector lens 82 and the condenser lens 84.

The collector lens 82, the field stop 85, the aperture stop 88, and the condenser lens 84 are aligned, and are arranged in the order of the collector lens 82, the field stop 85, the aperture stop 88, and the condenser lens 84. The collector lens 82, the field stop 85, the aperture stop 88, and the condenser lens 84 are disposed in a light-shielding housing 89. The aperture stop 88 and the end portion 50d of the light-receiving fiber 50C are conjugate points with respect to the collector lens 82. The field stop 85 and the end portion 74d of the connection fiber 74D are conjugate points with respect to the condenser lens 84.

In one embodiment, the connection fiber 74D may be omitted, and the light-shielding housing 89 may be connected to the spectrometer 26 such that the condenser lens 84 faces an incident surface of the spectrometer 26. In this configuration, the field stop 85 and the incident surface of the spectrometer 26 are conjugate points with respect to the condenser lens 84.

A degree of opening of the field stop 85 and a degree of opening of the aperture stop 88 are configured to be variable. The field stop 85 and the aperture stop 88 are electrically connected to the processor 27, and an operation of the field stop 85 and an operation of the aperture stop 88 are controlled by the processor 27. The quantity of light traveling from the end portion 50d of the light-receiving fiber 50C to the end portion 74d of the connection fiber 74D is regulated by the degree of opening of the aperture stop 88. Therefore, the quantity of reflected light from the wafer to the spectrometer 26 can be regulated by the aperture stop 88.

The light-receiving region (i.e., film-thickness measuring region) can be regulated by the degree of opening of the field stop 85. Specifically, when the degree of opening of the field stop 85 is decreased, the light-receiving region (i.e., film-thickness measuring region) becomes small. When the degree of opening of the field stop 85 is increased, the light-receiving region (i.e., film-thickness measuring region) becomes large.

This embodiment makes it possible to select an appropriate size of the light-receiving region, i.e., the film-thickness measuring region, based on the type of structure such as a device or a film formed on the surface of the wafer. As a result, the film-thickness measuring device 25 can measure an accurate film thickness.

The film-thickness measuring region, i.e., the degree of opening of the field stop 85, is determined in advance before polishing of the wafer based on the type of structure such as a device or a film formed on the surface of the wafer. The processor 27 operates the field stop 85 before polishing of the wafer so as to adjust the degree of opening of the field stop 85. The processor 27 may further operate the field stop 85 during polishing of the wafer to change the degree of opening of the field stop 85. For example, when an upper film of the wafer is removed and a lower film is exposed, the processor 27 may operate the field stop 85 to change the degree of opening of the field stop 85. Such operation makes it possible to accurately measure the film thickness based on the structure of the exposed surface of the wafer.

While the film-thickness measuring device 25 according to each of the above-described embodiments is an In-situ type film-thickness measuring apparatus incorporated in the polishing apparatus, the present invention can be applied to a stand-alone type film-thickness measuring apparatus.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A film-thickness measuring apparatus comprising:
 a light source;
 an illuminating fiber coupled to the light source and having a distal end disposed at a predetermined position in a wafer supporting structure, the illuminating fiber not projecting from a surface of the wafer supporting structure;
 a spectrometer configured to decompose reflected light from a wafer in accordance with wavelength and measure an intensity of the reflected light at each of wavelengths;
 a first light-receiving fiber having a distal end disposed at the predetermined position, the first light-receiving fiber being coupled to the spectrometer;
 a second light-receiving fiber having a distal end which is disposed at the predetermined position and is adjacent to the distal end of the first light-receiving fiber;
 a processor configured to determine a film thickness of the wafer based on a spectral waveform indicating a relationship between the intensity of the reflected light and the wavelength; and
 an optical-path selecting mechanism configured to optically connect and disconnect the second light-receiving fiber and the spectrometer.

2. The film-thickness measuring apparatus according to claim 1, wherein the distal end of the second light-receiving fiber comprises a plurality of distal ends which are arranged around the distal end of the first light-receiving fiber.

3. The film-thickness measuring apparatus according to claim 1, wherein the distal end of the first light-receiving fiber comprises a plurality of distal ends which are arranged around the distal end of the second light-receiving fiber.

4. The film-thickness measuring apparatus according to claim 1, wherein the optical-path selecting mechanism comprises an optical-path switching device configured to selectively connect the second light-receiving fiber to either the spectrometer or the light source.

5. The film-thickness measuring apparatus according to claim 4, wherein the optical-path switching device includes:
 a first connection fiber coupled to the light source;
 a second connection fiber coupled to the spectrometer; and
 an optical switch configured to couple the second light-receiving fiber to either the first connection fiber or the second connection fiber.

6. The film-thickness measuring apparatus according to claim 1, wherein the optical-path selecting mechanism comprises a shutter mechanism disposed between the second light-receiving fiber and the spectrometer.

7. A polishing apparatus, comprising:
 a wafer supporting structure;
 a polishing head configured to press a wafer against a polishing pad on the wafer supporting structure; and
 a film-thickness measuring apparatus including
  a light source,
  an illuminating fiber coupled to the light source and having a distal end disposed at a predetermined position in the wafer supporting structure, the illuminating fiber not projecting from a surface of the wafer supporting structure,
  a spectrometer configured to decompose reflected light from the wafer in accordance with wavelength and measure an intensity of the reflected light at each of wavelengths,
  a first light-receiving fiber having a distal end disposed at the predetermined position, the first light-receiving fiber being coupled to the spectrometer,
  a second light-receiving fiber having a distal end which is disposed at the predetermined position and is adjacent to the distal end of the first light-receiving fiber,
  a processor configured to determine a film thickness of the wafer based on a spectral waveform indicating a relationship between the intensity of the reflected light and the wavelength, and
  an optical-path selecting mechanism configured to optically connect and disconnect the second light-receiving fiber and the spectrometer.

8. A polishing method comprising:
 pressing a wafer against a polishing pad by a polishing head to polish the wafer, while measuring a film thickness of the wafer by a film-thickness measuring apparatus,
 the film-thickness measuring apparatus including
 (i) a light source,
 (ii) an illuminating fiber coupled to the light source and having a distal end disposed at a predetermined position in a wafer supporting structure, the illuminating fiber not projecting from a surface of the wafer supporting structure,
 (iii) a spectrometer configured to decompose reflected light from a wafer in accordance with wavelength and measure an intensity of the reflected light at each of wavelengths, (iv) a first light-receiving fiber having a distal end disposed at the predetermined position, the first light-receiving fiber being coupled to the spectrometer,
(v) a second light-receiving fiber having a distal end which is disposed at the predetermined position and is adjacent to the distal end of the first light-receiving fiber,
(vi) a processor configured to determine a film thickness of the wafer based on a spectral waveform indicating a relationship between the intensity of the reflected light and the wavelength, and
(vii) an optical-path selecting mechanism configured to optically connect and disconnect the second light-receiving fiber and the spectrometer; and operating the optical-path selecting mechanism by the processor to optically connect or disconnect the second light-receiving fiber and the spectrometer during polishing of the wafer.

\* \* \* \* \*